United States Patent
Auslander et al.

(10) Patent No.: US 6,341,345 B1
(45) Date of Patent: Jan. 22, 2002

(54) MIXED-ENDIAN COMPUTER SYSTEM THAT PROVIDES CROSS-ENDIAN DATA SHARING

(75) Inventors: Marc Alan Auslander, Millwood, NY (US); Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/475,669

(22) Filed: Jun. 7, 1995

Related U.S. Application Data

(63) Continuation-in-part of application No. 08/393,968, filed on Feb. 24, 1995, now Pat. No. 5,928,349.

(51) Int. Cl.[7] .............................................. G06F 12/02
(52) U.S. Cl. .......................... 712/204; 711/100; 703/27
(58) Field of Search ........................ 711/100; 707/523, 707/524; 703/27, 26; 714/702; 712/204

(56) References Cited

U.S. PATENT DOCUMENTS

| | | | | |
|---|---|---|---|---|
| 4,999,808 A | * | 3/1991 | Blahut et al. ............... | 395/898 |
| 5,107,415 A | * | 4/1992 | Sato et al. .................. | 395/800 |
| 5,132,898 A | | 7/1992 | Sakamura et al. .......... | 395/425 |
| 5,191,581 A | | 3/1993 | Woodbury et al. ......... | 370/85.9 |
| 5,237,672 A | | 8/1993 | Ing-Simmons et al. ..... | 395/425 |
| 5,251,312 A | | 10/1993 | Sodos ........................ | 395/425 |
| 5,261,077 A | | 11/1993 | Duval et al. ............... | 395/500 |
| 5,287,470 A | | 2/1994 | Simpson .................... | 395/425 |
| 5,313,231 A | | 5/1994 | Yin et al. ................... | 345/199 |
| 5,398,328 A | * | 3/1995 | Weber et al. ............... | 395/500 |
| 5,408,664 A | * | 4/1995 | Zarrin et al. ................ | 395/700 |
| 5,446,482 A | | 8/1995 | Van Aken et al. .......... | 345/199 |
| 5,519,842 A | * | 5/1996 | Atallah et al. .............. | 395/412 |
| 5,574,923 A | | 11/1996 | Heeb et al. ................. | 395/800 |
| 5,574,927 A | | 11/1996 | Scantlin ..................... | 395/800 |
| 5,594,919 A | * | 1/1997 | Turkowski .................. | 395/800 |
| 5,604,905 A | * | 2/1997 | Tevanian et al. ............ | 395/706 |

FOREIGN PATENT DOCUMENTS

| | | |
|---|---|---|
| EP | 0470570 | 2/1992 |
| GB | 2229832 | 10/1990 |
| JP | 63217416 | 9/1988 |
| WO | WO9415269 | 7/1994 |

OTHER PUBLICATIONS

Steve Undy et al., "A Low–Cost Graphics and Multimedia Workstation Chip Set", IEEE MICRO, vol. 14, No. 2, pp. 10–22, Apr. 1994.*

David V. James, "Multiplexed Buses: The Endian Wars Continue", IEEE MICRO, vol. 10, No. 3, pp. 9–21, Jun. 1990.*

Patick Knebel et al., "HP's PA7100LC: A Low–Cost Superscalar PA–RISC Processor", COMPCON Spring '93 IEEE Computer Society Int'l. Conference, IEEE/IEE Publications Ondisc, 1993.*

Journal of Controlled Release, vol. 28, No. 1/03, Jan. 1, 1994, pp. 37–44, XP000435238, C. D. Ebert et al., "Mucosal Delivery of Macromolecules."

\* cited by examiner

*Primary Examiner*—Hiep T. Nguyen
(74) *Attorney, Agent, or Firm*—Steven W. Roth

(57) ABSTRACT

A conventional bi-endian computer system is enhanced to include mixed-endian mechanisms that allows the computer system to dynamically change its endian mode. The mixed-endian computer system can change endian mode on a task by task basis if necessary. The mixed-endian mechanisms automatically format the data in the form expected by the running task, regardless of whether the task expects the data to be in big endian format or in little endian format. The mixed-endian mechanisms also format big and little endian instructions such that they can execute on the same computer system. The mixed-endian mechanisms also include two memory management mechanisms, a single aliased memory management mechanism and a double aliased memory management mechanism. Each memory management mechanism provides cross-endian data sharing.

6 Claims, 23 Drawing Sheets

| WORD SIZE | ADDRESS MODIFICATION |
|---|---|
| BYTE (8-BIT) | XOR 7 |
| HALF WORD (16-BIT) | XOR 6 |
| WORD (32-BIT) | XOR 4 |
| DOUBLE WORD (64-BIT) | XOR 0 |

FIG. 3B (PRIOR ART)

Standard, nonsegmented virtual address space view

Single Aliased Segment Sharing of Shared Address Segment 504 between big and little endian tasks' address spaces Double Alias Segment Sharing of Common Shared Segment 504 between big and little endian tasks' address spaces Double Alias Page Example of common shared address space VA504

Double Alias Page Example of common shared segment VA504 (after both page faults)

Page Fault

Page Fault

Double Aliasing Special
Page Fault Path

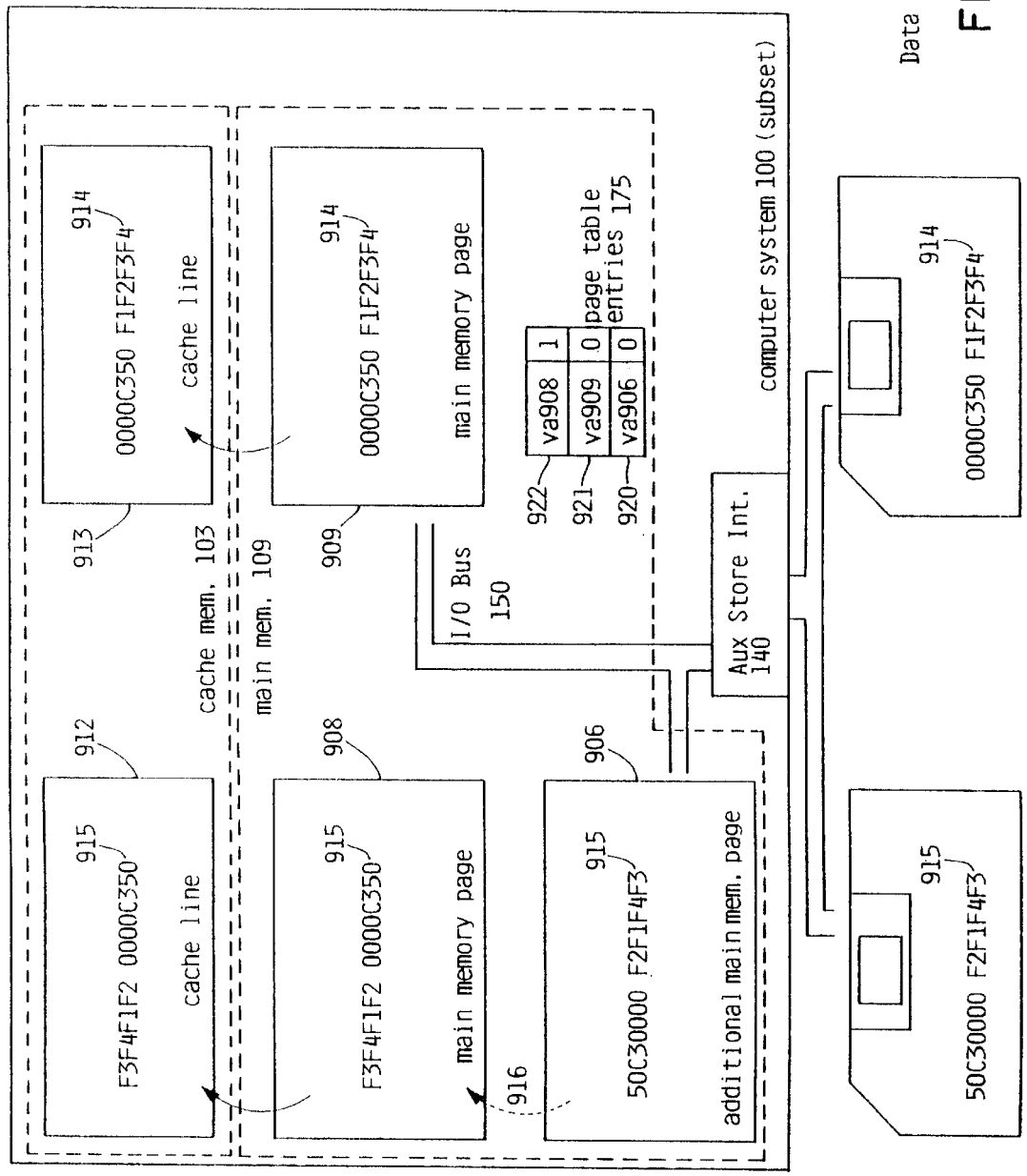
FIG. 9C Data Flow Diagram

MIXED-ENDIAN COMPUTER SYSTEM THAT PROVIDES CROSS-ENDIAN DATA SHARING

CROSS REFERENCE TO RELATED APPLICATIONS

This application is a continuation in-part of application Ser. No. 08/393,968, now U.S. Pat. No. 5,928,349, filed Feb. 24, 1995, entitled "A Mixed-Endian Computing Environment for a Conventional Bi-Endian Computer System."

FIELD OF THE INVENTION

The present invention pertains generally to the field of data processing, and more particularly to the field of endian oriented computer systems.

BACKGROUND OF THE INVENTION

The earliest digital computers built in the late 1940's had simple designs and components. Despite numerous advances in technology over the years, most modern day computers still use the same basic components to perform the same fundamental tasks of storing and manipulating information.

Two of these basic components are computer memory and a processor. Computer memory stores information being used by the computer, and works in much the same way as the memory of a person. For example, just as people can remember ideas about different topics and events, the memory of a computer system can be used to store words, numbers, pictures, and other forms of information.

A computer processor is the active component of the computer system. The processor operates on the information stored in the computer system's memory to carry out the task assigned to the computer system. The tasks being processed by the computer system are also sometimes called jobs, programs, or processes.

A computer processor running a job reads and processes information stored in computer memory in much the same way a person reads and processes the words printed on the page of a book. Therefore, just as the arrangement of words on a page is important to human readers, the arrangement of information in the computer system's memory is important to the computer system. For example, words in English are written from left to right and words in Hebrew are written from right to left. People who read only English are able to understand English words that are written from left to right and people who read only Hebrew are able to understand Hebrew words that are written from right to left. The fact that English words are written on a page from left to right does not mean that it is better to arrange words in this manner instead of arranging them from right to left. English words are written from left to right simply because English readers expect words to be written from left to right. In this sense, the arrangement of information in the memory of a computer system is not different than the arrangement of words on a page. One way of arranging the information is not better than any other way of arranging the information. However, computer systems are also just like people in the sense that if the information is not arranged in a way that the computer system expects, the information cannot be understood by the computer system.

Of course, the fact that one way of arranging computer system information is not better than any other way of arranging the information has "opened the door" for different approaches to organizing information in computer system memory. It is no surprise, then, that computer system designers would at some point develop different schemes for organizing at least some forms of computer system information. One such divergence occurred some time ago for two particular forms of computer system information (called floating point information and binary integer information). At present, there are two common schemes for arranging these types of computer system information. The two schemes were dubbed "little endian" and "big endian" after the warring tribes from the famous book *Gulliver's Travels* written by Jonathan Swift. While the terms are colorful, they have no significance to computer systems beyond denoting how these types of information are arranged on a particular computer system.

In the late 1970's and early 1980's, INTEL CORPORATION introduced processors which became the standard for IBM PC and compatible personal computers. These computer systems used the so-called little endian arrangement. During this same time, other computer systems were designed using the so-called big endian arrangement. These later computer systems included processors manufactured by MOTOROLA Corporation and used in computer systems manufactured by APPLE Corporation.

In the past, the way computer systems organized information (in big or little endian format) within their memory was not a significant problem because it was not considered advantageous to arrange information in more than one way on a single computer system.

Today, however, the tremendous growth of computers used in businesses and homes has given rise to a serious need for compatibility between the different types of computer systems. For example, persons who use IBM PC or compatible computers cannot generally share computer programs and information with persons who use APPLE Macintosh computers, and vice versa. Large corporations that use both types of computers find it difficult to distribute information among employees. Small businesses often find that they cannot easily share information with suppliers or buyers who do not have the same type of computers. Consequently, computer software developers are often forced to devote additional time and resources to develop multiple versions of the same software so as to support different types of computer systems. In short, the inability to arrange certain types of information in more than one way on a single computer system has in large part resulted in delayed products, lost productivity, reduced efficiency, and increased capital expenditures.

Some existing computer systems do attempt to deal with the endian problem, but only in a limited fashion. These computer systems have what can be referred to as bi-endian capability. Essentially, bi-endian capability means that the same computer system can be made to execute either big endian tasks or little endian tasks, but not both types of tasks together. In other words, when the computer system is first started, the computer system is told whether it will be running big endian or little endian tasks (i.e., the computer system can be made to run in either big endian mode or little endian mode). Switching an existing bi-endian computer system's endian mode (i.e., big endian mode to little endian mode or vise versa) requires special purpose software that executes very early in the computer's initialization cycle (i.e., very close to start-up). Thereafter, all tasks will execute in the specified endian. For practical purposes, then, bi-endian computer systems are really equivalent to regular, "mono-endian," computer systems once they have completed their boot process.

While these bi-endian computer systems do provide additional flexibility by providing the ability to run either big endian or little endian tasks, they do not solve the problem associated with the need to allow tasks having different information format expectations (i.e., big versus little endian) to co-exist and execute, task for task, on a single computer system.

Without a computer system that can simultaneously run programs from both endian environments and share information between those programs, the incompatibility problems of today will continue to plague the computer industry.

SUMMARY OF THE INVENTION

It is a principal object of this invention to provide an enhanced computer system that allows tasks having different information format expectations (i.e., big versus little endian) to co-exist and execute, task for task, on a single computer system without the need for specialized hardware while nonetheless allowing tasks of one endian to access data formatted in the alternate endian.

It is another object of this invention to provide an enhanced computer system that allows tasks having different information format expectations (i.e., big versus little endian) to co-exist and execute, task for task, on a single computer system without the need for specialized hardware while nonetheless allowing such tasks to access data formatted in the alternate endian in a way that does not require the accessing tasks to understand and manage the internal data representations of the computer system processor.

A novel apparatus and method that allows tasks having different information format expectations (i.e., big versus little endian) to co-exist and execute, task for task, on a single computer system and to make cross-endian data references is disclosed herein.

The mixed endian computer system of the present invention is an enhancement to an existing bi-endian computer system. Mixed-endian mechanisms have been added that allow an existing bi-endian processor to change its endian mode dynamically. The mechanisms allow the mixed-endian computer system to change endian mode on a task by task basis if necessary. The mixed-endian mechanisms automatically format the data in the form expected by the running task, regardless of whether the task expects the data to be in big endian format or in little endian format. The mixed-endian mechanisms also allow big and little endian tasks to share data without having to understand and manage the internal data representation of the computer system processor.

BRIEF DESCRIPTION OF THE DRAWINGS

FIG. 3b is a table showing how little endian addresses are modified in the IBM PowerPC architecture.

FIG. 9a through 9c are flow and data diagrams showing how the single and double aliasing mechanisms of the preferred embodiment provide cross-endian data sharing.

DESCRIPTION OF THE PREFERRED EMBODIMENT

Overview of Address Modification and Doubleword Reflection

As previously discussed, the present invention pertains to the storage and use of big and little endian information on a single computer system. More specifically, the present invention is an enhanced computer system that allows tasks, having different endian expectations (i.e., either big or little) to not only co-exist on a single computer system, but to execute, task for task, on a single computer system as well.

A basic overview of the problem and solution is presented here so that the reader can fully appreciate the benefits and advantages of the present invention. A more detailed description of the inner-workings of this invention can be found in the "Detailed Description" section of this specification.

Figure 2A:
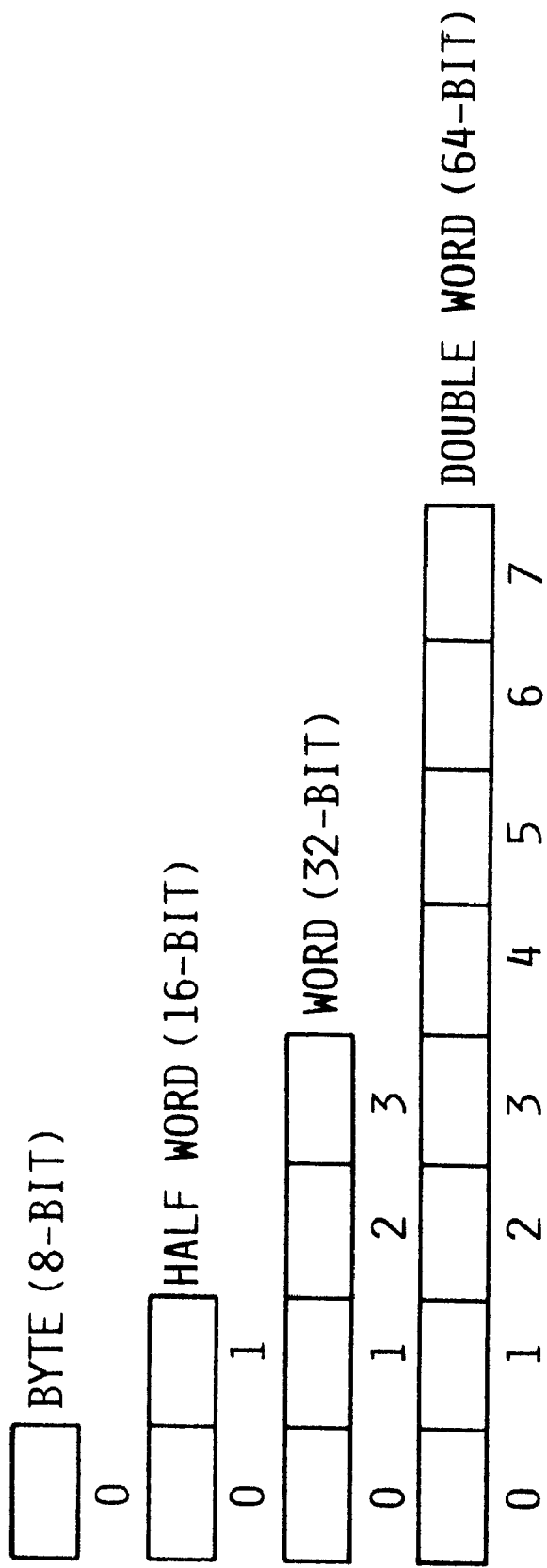
FIG. 2a is a data diagram showing data word sizes used in the IBM PowerPC architecture.
Figure 2B:
FIG. 2b is a data diagram showing big endian and little endian data formats.
Figure 2B:
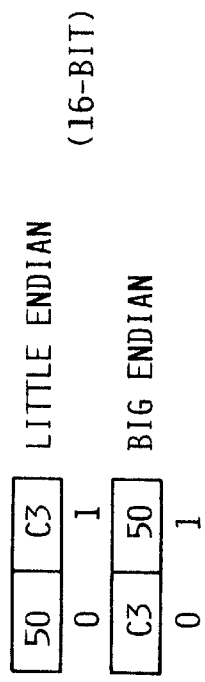
Figure 2B:
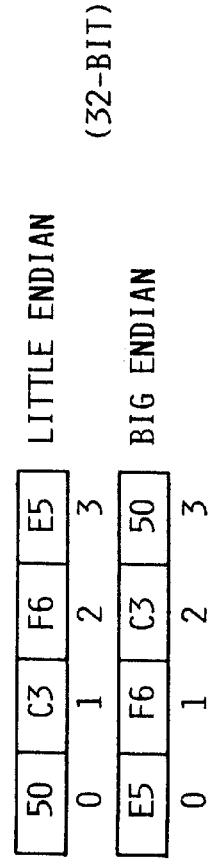
Figure 2B:
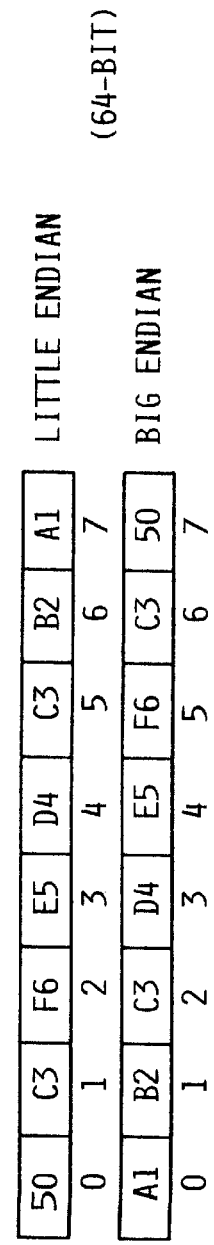

As shown in FIG. 2b, the big endian data format involves storing the most significant byte of the word at the lowest memory address, the next most significant at the lowest plus 1, and so on. For example, a 32-bit integer representing a decimal value of 50,000 is stored in hexadecimal in ascending bytes as 0000C350, where address offset 0 is 00 and offset 3 is 50. By contrast, the little endian format involves storing the least significant byte is stored at the lowest memory address, the next least significant at the lowest plus 1, and so on. For example, a 32-bit integer representing a decimal value of 50,000 is stored in hexadecimal in ascending bytes as 50C30000, where address offset 0 is 50 and offset 3 is 00.

Because of the endian problem, computer programs written to run on a little endian machine typically will not run on a big endian machine, and vice versa. For example, it is currently difficult to design a program which will operate unmodified when originally compiled for one endian and recompiled for the other endian, even when fully standardized languages are used. This is because language standards do not specify the endian of the data and always use the underlying endian of the computer system they compile for. Since programmers often overlay a given piece of storage with an alternate definition, source code that redefines storage may have to change to produce the same results when the underlying endian changes for a different machine, as the following C code segment illustrates:

```
typedef struct {
  int a;
  short int b;
  char c[5];
} example;
example x;
x.a=0x01020304;
x.b=0x1112;
strcpy(x.c,"\x21\x22\x23\x24");
```

On a little endian computer, information would be stored in memory as hexadecimal:

| offset | 0 | 1 | 2 | 3 | 4 | 5 | 6 | 7 | 8 | 9 | A |
|---|---|---|---|---|---|---|---|---|---|---|---|
|  | 04 | 03 | 02 | 01 | 12 | 11 | 21 | 22 | 23 | 24 | 00 |

On a big endian computer, the information would be stored in memory as hexadecimal:

| offset | 0 | 1 | 2 | 3 | 4 | 5 | 6 | 7 | 8 | 9 | A |
|---|---|---|---|---|---|---|---|---|---|---|---|
|  | 01 | 02 | 03 | 04 | 11 | 12 | 21 | 22 | 23 | 24 | 00 |

Now consider the following:

```
/* This routine takes a 64 bit integer, presumed to be a time stamp
   formatted in two words, one of seconds and one of fractions of a
   second, and returns the seconds part of the integer */
INT32 return_seconds(INT64 timestamp_whole /* a 64-bit integer */) {
  typedef struct {
    INT32 upper;   /* time in seconds */
    INT32 lower;   /* the lower 32 bits of time (fraction of a second) */
  } timestamp_split;
  timestamp_split X = *(&(timestamp_split) timestamp_whole);
  return (X.upper);   /* extract what is presumed the upper 32 bits */
}; /* end return_seconds */
```

The data structure, "timestamp_split", is big endian because of how it overlays a 64-bit integer with two 32-bit integers. The setting of variable X only works correctly under big endian rules. In many time stamp formats, where the high order 32 bits are the time in seconds, the need to access the seconds conveniently necessitates such structures. However, any references to this data structure must be modified throughout the application if the program is moved to a little endian environment with a little endian timestamp. This is because the program above orders the words within a double word implicitly assuming big endian ordering, and this ordering remains in the same order, big endian dependent, even if recompiled for a little endian target machine, because timestamp_split formally describes the ordering as two adjacent four byte integers.

It is the encoding of ordering relationships of this kind, in many guises, which cause programs to have widely scattered dependency on the endian for which the program is first targeted. Unless carefully planned for in advance, programs developed on a system having one endian environment may be difficult and costly to port to a system having the other endian environment. Therefore, programs designed for execution on a system using one endian environment are rarely converted for execution on a computer system of the other environment.

For the purpose of illustration, a 32-bit word size is used throughout this overview, and corresponding portions of words are shown in FIG. 2a. It will be recognized, however, that computer systems utilizing other word sizes, such as 16-bit and 64-bit, may be used with the present invention without loss of generality.

As mentioned, some computer systems, called bi-endian computer systems, are able to change their external endian mode. Internally, however, a bi-endian computer system can be viewed as a computer system that is biased toward one particular endian, while at the same time including circuitry that provides the alternate endian mode. This circuitry is initialized by special purpose software to control the endian mode of the computer system. When the circuitry is initialized to operate in the alternate endian mode, reflection of the data takes place. The need for reflection is simply a consequence of how the bi-endian computer system handles the difference between big and little endian data formats. Therefore, once a bi-endian computer system is up and running, reflection either always occurs or never occurs, depending of course on whether the computer system has been told to run in its alternate endian mode.

The preferred processor of the present invention is an enhanced IBM PowerPC processor. The PowerPC architecture is described in the PowerPC Architecture Manual, May, 1994, IBM Corporation, Pub. No. SR28-5124-01, which is herein incorporated by reference. The bi-endian processors of the PowerPC (e.g., the Model 620) family are biased toward big endian. While a PowerPC bi-endian processor has been chosen for the preferred embodiment, those skilled in the art will appreciate that the present invention is not limited to any particular bi-endian processor and that the present invention is not limited to any particular endian bias.

Because IBM bi-endian PowerPC processors are biased toward big endian, they handle little endian tasks via a two step process. The first step is the aforementioned reflection. The reflection step essentially rearranges the data such that it can be accessed correctly given the big endian bias of the processors. The second step, called address modification, converts the addresses used to reference the data from big endian addresses to little endian addresses. At this point, it should be reiterated that the present invention is not limited to any particular endian bias. Accordingly, it should be understood that present invention applies equally to any bi-endian processor that, because of a little endian bias, handles big endian tasks through some type of reflection and address modification.

As has been discussed, there are two possible endian situations that exist when running in a mixed-endian processing environment. The first possibility is where the internal endian of the processor matches that of the software task. In this case, no conversion of software data is required, since the data byte order and data address offset can be read directly by the processor. The second possibility is where the internal endian of the processor does not match that of the software task. In this latter case, the aforementioned two-step process is used within PowerPC computer systems. These steps are illustrated in the tables shown as FIGS. 3a and 3b. The first step is a reflection which must be performed on the bytes comprising the data double word or fragment thereof (see FIG. 3a). The second step is a modification of the memory address offset of the bytes comprising the data double word to accommodate the new location of the bytes after the reflection that was performed in the first step (see FIG. 3b).

The reflection step may be performed in a variety of places, and is entirely mechanical and unrelated to the data element size being fetched. The reflection starts from storage which is presumed to be in the "true" endian format of the alternate endian and is then reflected. The reflection is based on its relative offset within a virtual addressed page, a real addressed page, or an associated cache line as an aligned double word or as a well-defined fragment thereof, as part of the fetch or store along the fetch/store data pathway prior to the second step of address modification. Referring to the table shown in FIG. 3a, byte 0 is exchanged with byte 7, byte 1 is exchanged with byte 6, byte 2 is exchanged with byte 5, and byte 3 is exchanged with byte 4. The result is that storage has now been changed from one endian to the other, but is residing at a different offset than expected by the programmer. It will be recognized that other reflections for word sizes other than 64-bits may be performed with the present invention without loss of generality.

Figure 3A:
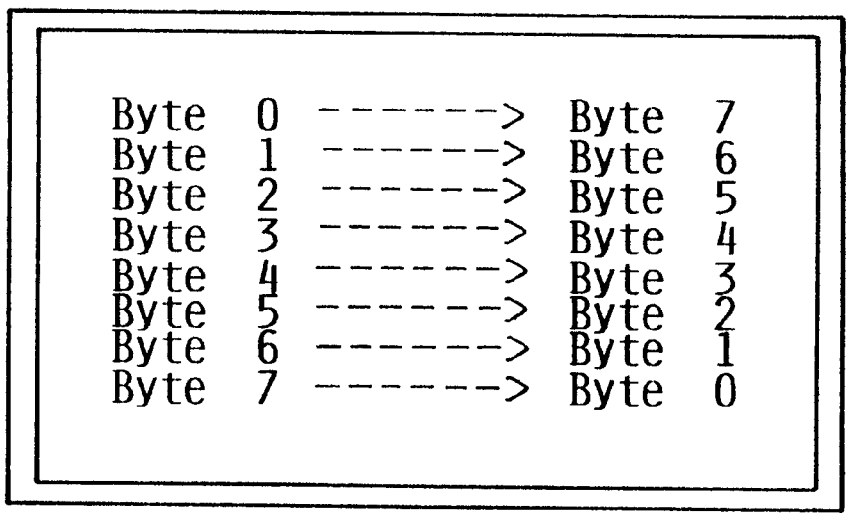
FIG. 3a is a table showing how data is reflected in the IBM PowerPC architecture.

The reflection shown in FIG. 3a and performed by mechanisms of the present invention is sometimes referred to as double word reflection, but whenever the word "reflection" appears without qualification it should be taken to refer to the double word reflection shown in FIG. 3a.

The second step performs an address modification which depends on the size of the data word which is being referenced by the processor. Referring to FIG. 3b, a preferred system performs an Exclusive-or (XOR) 7 operation during a 8-bit byte memory reference, an XOR 6 operation during a 16-bit half word memory reference, an XOR 4 operation during a 32-bit word memory reference, and an XOR 0 operation during a 64-bit memory reference. In the preferred embodiment of the present invention for either a 16-bit, 32-bit, or 64-bit word processor, the address offset modification is generalized by performing an appropriate XOR operation on the three least significant bits of the address offset.

FIGS. 4a through 4d show conversions from little endian to big endian format for the following example:
```
typedef struct {
   INT32 word;
   INT16 hword;
   BYTE byte;
   BYTE end;
} demo;
demo x;
x.word=0x0000C350;
x.hword=0xF1F2;
x.byte=0xA1;
x.end=0x00;
```

Figure 4A:
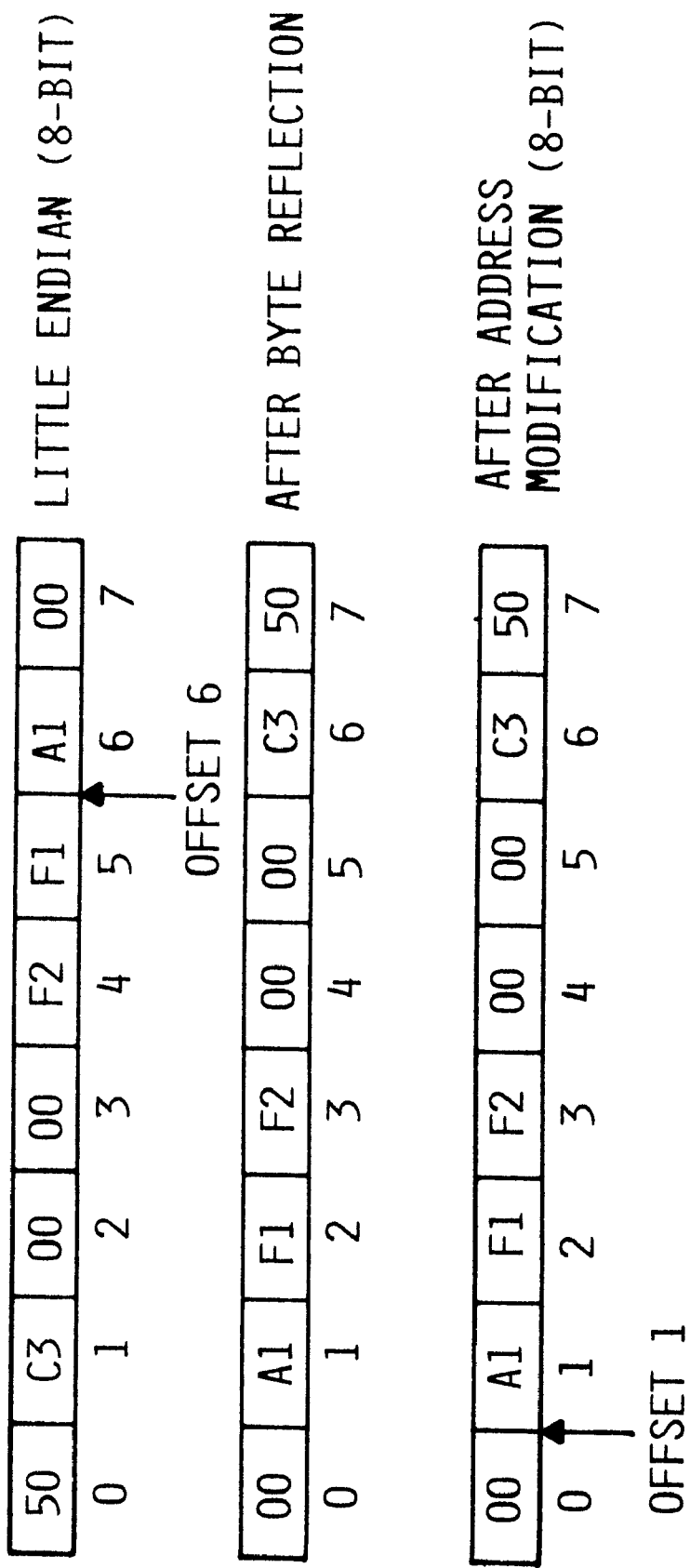
FIG. 4a is a data diagram showing how an 8-bit data item is fetched via the two-step little endian process used in bi-endian, PowerPC computer systems.
Figure 4B:
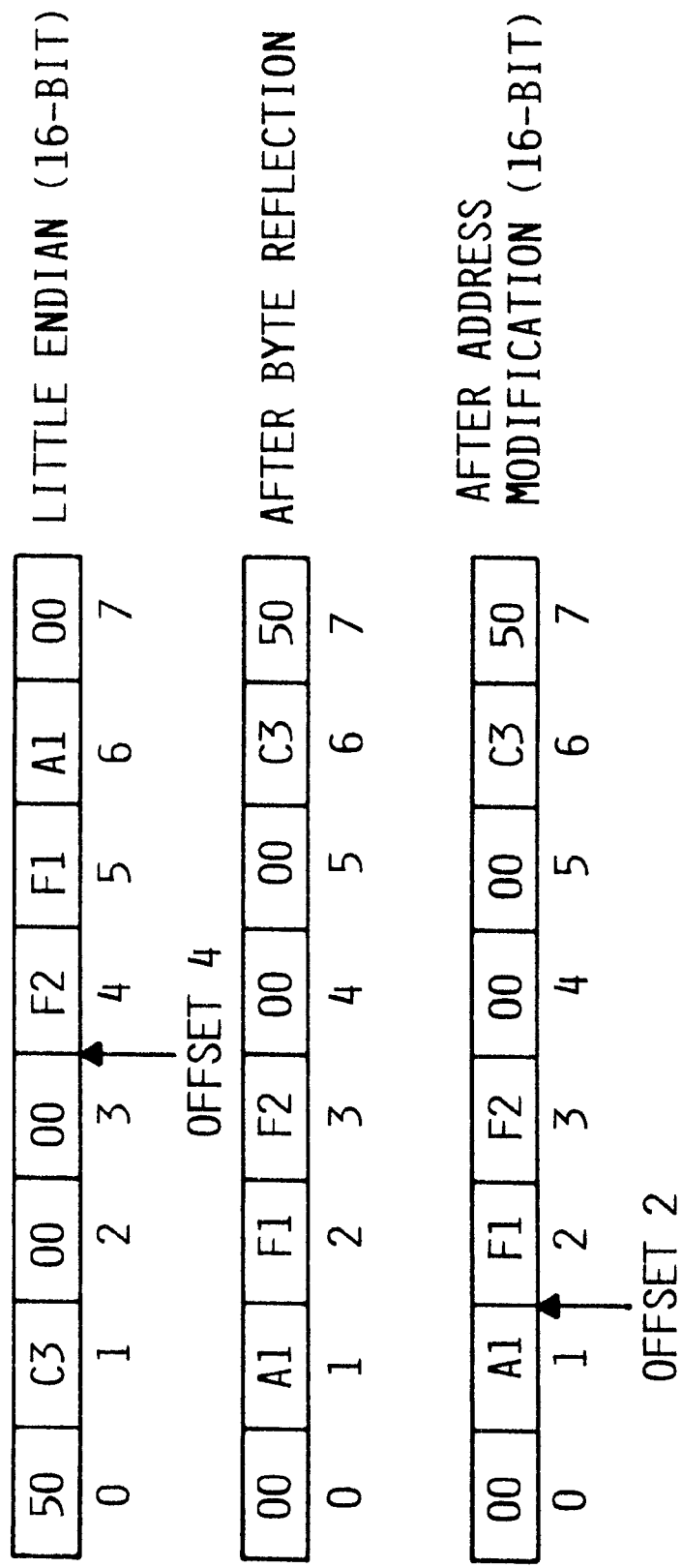
FIG. 4b is a data diagram showing how an aligned 16-bit data item is fetched via the two-step little endian process used in bi-endian, PowerPC computer systems.
Figure 4C:
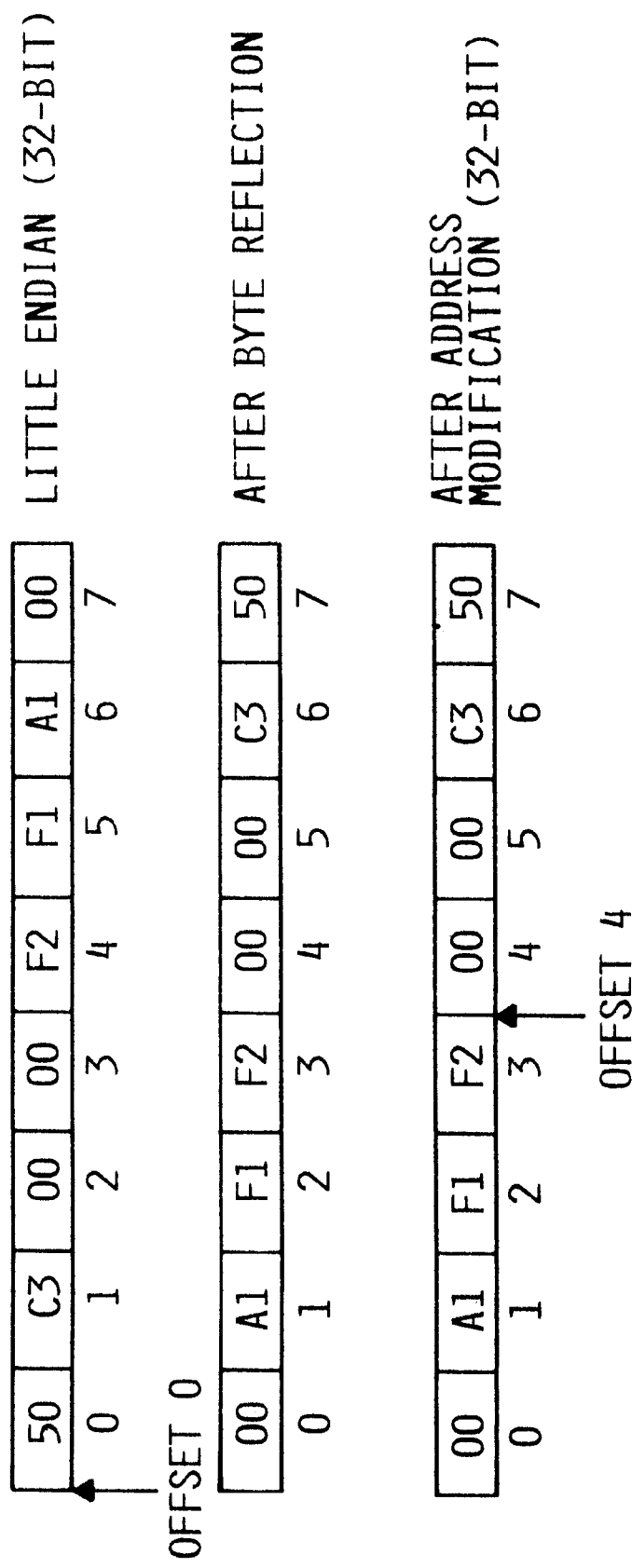
FIG. 4c is a data diagram showing how an aligned 32-bit data item is fetched via the two-step little endian process used in bi-endian, PowerPC computer systems.
Figure 4D:
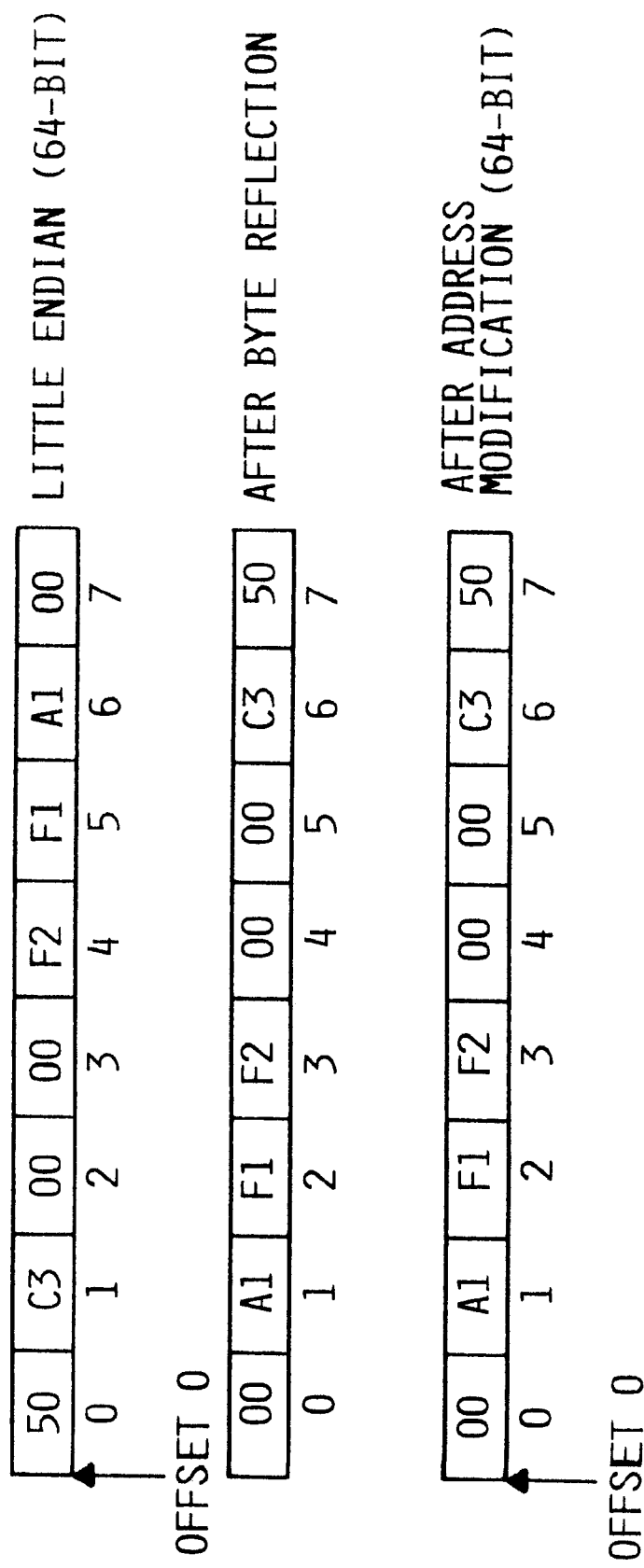
FIG. 4d is a data diagram showing bow an aligned 64-bit data item is fetched via the two-step little endian process used in bi-endian, PowerPC computer systems.

For example, in FIG. 4c, a 32-bit word is shown reflected from little endian format to big endian format and its location has changed from offset 0 to offset 4 during a 32-bit word fetch. To complete the processor fetch from memory, an address modification is performed on the address as originally presented by the software. In this case, the fetch of a 32-bit word, the original address has an offset of 0. The processor takes the presented address and performs an XOR 4, which fetches the corresponding big endian word from offset 4. It will be recognized that by performing an XOR 7 for 8-bit byte memory reference, an XOR 6 operation during a 16-bit half word memory reference, an XOR 4 operation during a 32-bit word memory reference, and an XOR 0 operation during a 64-bit memory reference, that storage that began in little endian format before the first step and is first reflected as described above, corrects the original offset from what the original software specified to an internally correct offset to account for the reflection. Since these steps are hidden by PowerPC computer systems, a programmer cannot tell that the environment is anything other than true little endian. Additional examples of the two-step conversion process from little endian to big endian format, corresponding to 8-bit, 16-bit, and 64-bit memory references, are given in FIGS. 4a, 4b, and 4d.

Figure 5:
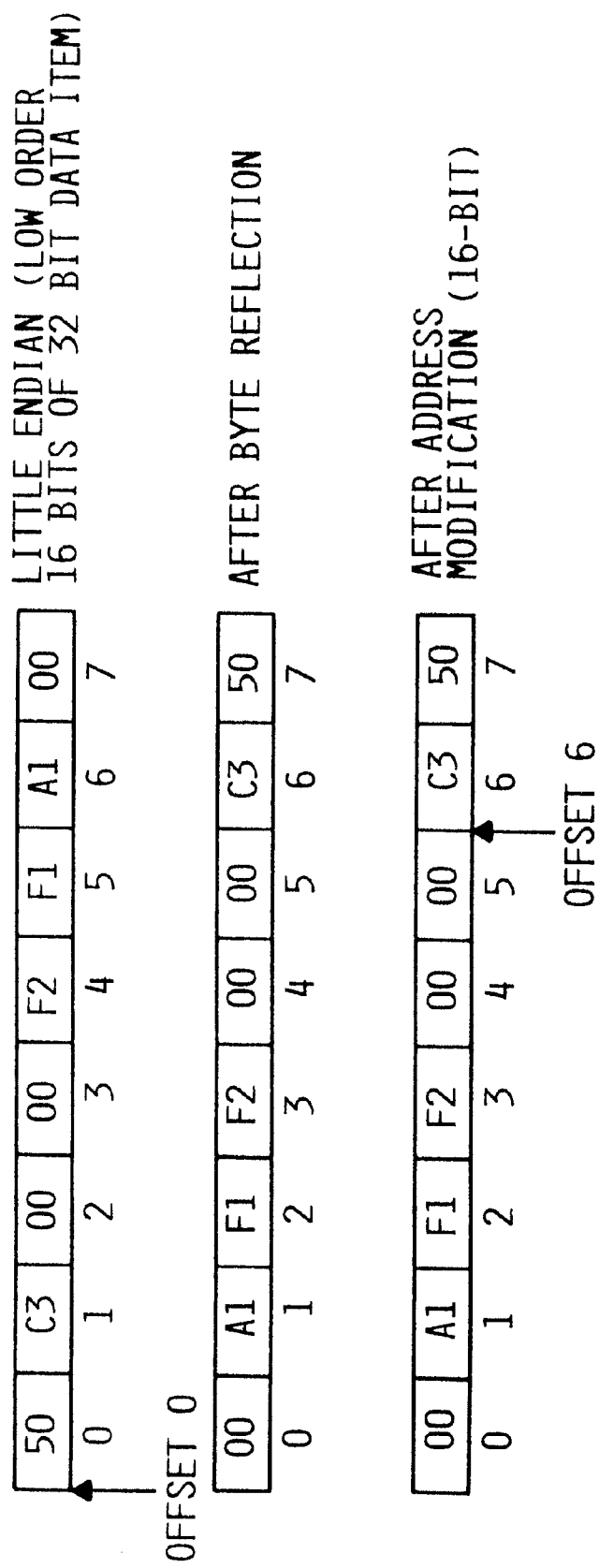
FIG. 5 demonstrates how the low order 16 bits of a 32-bit little endian integer may be fetched via the two-step little endian process used in bi-endian, PowerPC computer systems.

The PowerPC two-step conversion process described above also accommodates partial data reads. For example, FIG. 5 shows a fetch of the low order 16 bits, C3 50, of the 32-bit integer, 00 00 C3 50. Because the 32-bit integer is little endian, the software normally fetches the halfword at offset 0, using standard little endian rules. The 16-bit memory reference of the 32-bit word is accommodated by first reflecting the 32-bit word from little endian format to big endian format, as previously described in FIG. 4c. Because the current memory reference is for a 16-bit value, an XOR 6 is then performed as described in FIG. 3b, which fetches the correct big endian halfword from offset 6.

It will be recognized that the above description of an address offset modification is correct for word sizes of 16-bits, 32-bits, 64-bits, and extends readily to other word sizes. For example, a processor having a 128-bit word size performs a 16-byte word reflection in the first step, where byte 0 is exchanged with byte 15, byte 1 is exchanged with byte 14, byte 2 is exchanged with byte 13, byte 3 is exchanged with byte 12, byte 4 is exchanged with byte 11, byte 5 is exchanged with byte 10, byte 6 is exchanged with byte 9, and byte 7 is exchanged with byte 8. During the second step, the processor performs an XOR operation on the four least significant bits of the address offset, using in hexadecimal an XOR F for an 8-bit reference, an XOR E for a 16-bit reference, an XOR C for a 32-bit reference, an XOR 8 for a 64-bit reference, and an XOR 0 for a 128-bit reference.

DETAILED DESCRIPTION

Figure 1:
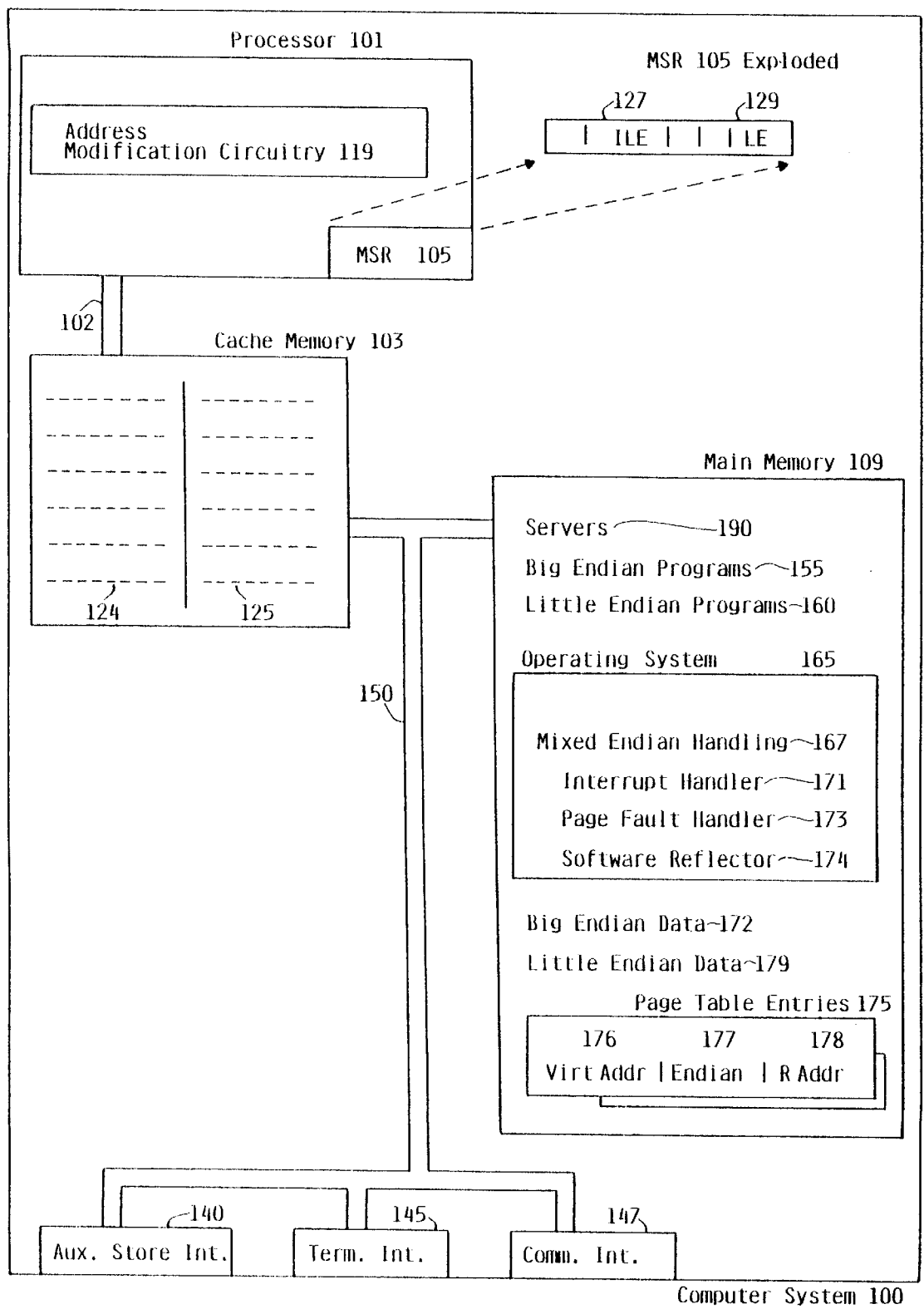
FIG. 1 is block diagram showing the computer system of the preferred embodiment.

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. As shown in the exploded view of FIG. 1, computer system 100 comprises processor 101 connected to system bus 150 via cache memory 103 and internal processor bus 102. Main memory 109, auxiliary storage interface 140, terminal interface 145, and communications interface 147 are also shown to be connected to system bus 150.

Processor 101 comprises address modification circuitry 119, and machine state register (MSR) 105. Processor 101 is an enhanced IBM bi-endian Power PC processor; however, any two step, bi-endian processor could be used. Address modification circuitry 119 is responsible for performing the address modification of FIG. 3b; however, its function could also have been implemented in software. MSR 105, which contains current task information associated with processor 101, also contains little endian (LE) status bit 129 and interrupt little endian (ILE) status bit 127. LE bit 129 indicates whether an address modification should be performed during a memory reference. The value of LE bit 129 is set by operating system 165 to reflect the endian of the current task running on processor 101. In the mixed endian environment of the present invention, the value of LE bit 129 varies in real time as software tasks of different endian execute on processor 101.

ILE bit 127 indicates the state LE bit 129 is to become upon receiving a processor interrupt. WLE bit 127 reflects the endian chosen for the software interrupt handler. The change of endian, if any, must be part of the interrupt process when changing from that of an application program endian (i.e. big endian programs 155 or little endian programs 160) to the interrupt handling endian. The value of ILE bit 127 is preferably only required to be set once by the operating system upon initial start-up of computer system 100 to reflect the choice of the interrupt handler endian. The value of ILE bit 127 typically does not change in real time because the endian bias of the interrupt handler typically does not change after initial start-up. It is possible to permanently fix the value of the ILE bit 127 to a constant value without loss of generality. However, this would have the side-effect of forcing the interrupt handler, and possibly the system software, to be of a particular endian.

Cache memory 103 comprises cache arrays 124 and 125. Cache memory 103 is a two way associative, copy-back cache; however, those skilled in the art will appreciate that the present invention is not limited to any particular cache mechanism. Cache arrays 124 and 125 each contain a plurality of cache array elements. As is known in the art, each cache array element contains a cache line, which contains the actual data, and certain control information.

Main memory 109, which is that known in the art as paged memory, contains big endian programs 155, little endian programs 160, servers 190, operating system 165, and other programs (not shown). Big endian programs 155 are programs that are designed to expect and operate with big endian data 172, while little endian programs are designed to expect and operate with little endian data 179. In special cases, however, programs can be designed to expect and operate with data of the alternate endian.

Operating system 165, which is further shown to contain mixed-endian handling mechanisms 167, is an enhanced IBM MicroKernel based, multi-tasking operating system; however, any appropriate multi-tasking operating system could be used. Mixed-endian handling mechanisms 167 comprises interrupt handler 171, page fault handler 173, and reflector 174. Mixed-endian handling mechanisms 167 are essentially responsible for dynamically controlling and tracking the two step process of PowerPC processor 101. However, those skilled in the art will appreciate that the spirit and scope of the present invention is not limited to the specific two step process that is used in bi-endian, PowerPC computer systems. Indeed, the mechanisms disclosed herein are equally applicable to any adjustment of data and addresses, regardless of the number or specifics of the steps taken.

Main memory 109 also contains big endian data 172, little endian data 179, and page table entries 175. Each of page table entries 175 comprises, amongst other things, a virtual address (e.g., virtual address 176), an endian bit (e.g., 177), and a real address (e.g., real address 178). There is one page table entry for each memory page currently in memory 109. The endian bits 177 contained in page table entries 175 denote the endian of the page (i.e., 1 for little endian and 0 for big endian).

Auxiliary storage interface 140 is used to interface computer system 100 with auxiliary storage devices such as magnetic or optical storage devices.

Terminal interface 145 allows system administrators and computer programmers to communicate with computer system 100, normally through programmable workstations.

Communications interface 147 is used to interface computer system 100 with external communications networks such as local area networks (LANs) and wide area networks (WANs). Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Data Sharing

Figure 6A:
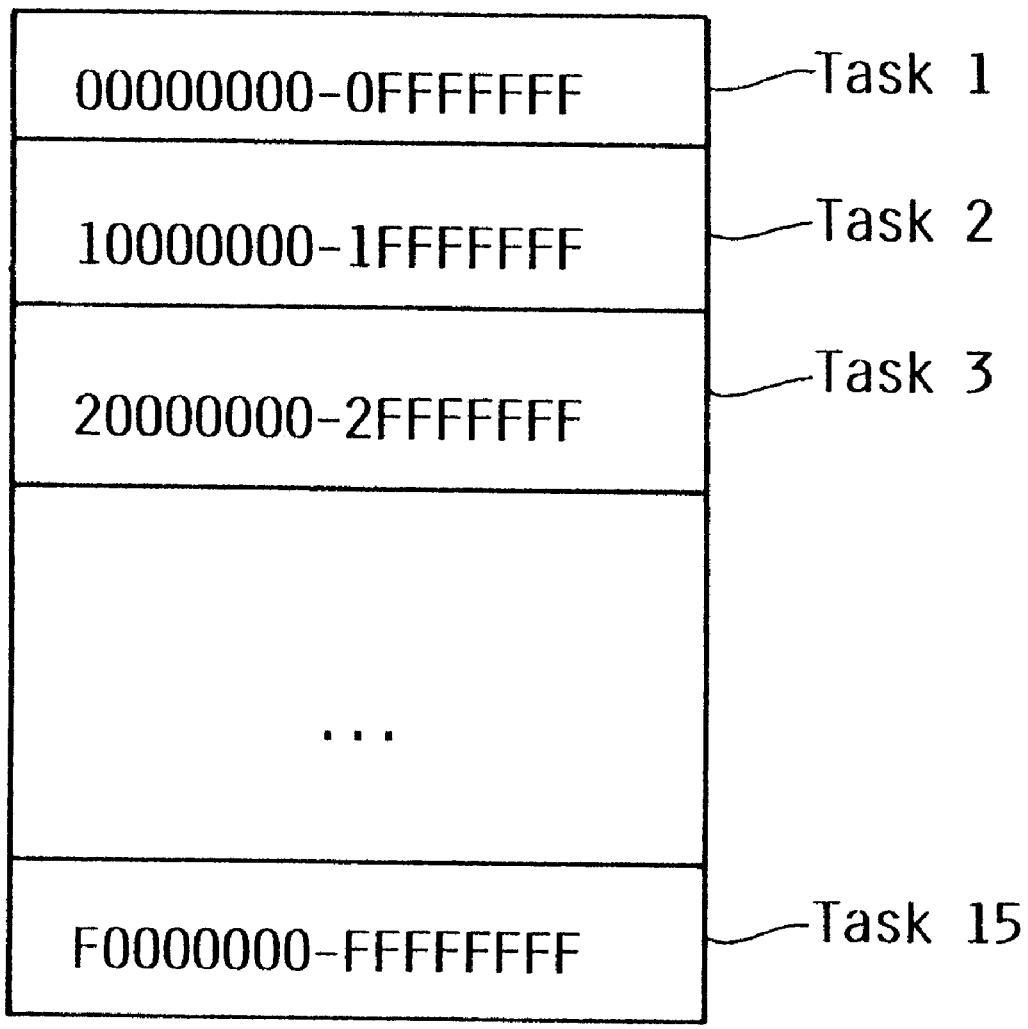
FIG. 6a is a block diagram showing a standard, partitioned memory architecture.

At the simplest possible abstraction, each task in a computer system could have its own, separate address space. That is to say, each task has its own, separate virtual address space, whose pages are entirely disjoint with every other task in the system. This type of simple memory architecture is shown on FIG. 6a. As shown on FIG. 6a, task 1 has an address range from HEX 00000000 to 0FFFFFFF, task 2 has an address range from 10000000 to 1FFFFFFF, and so forth. This simplistic memory architecture, however, is really not practical for today's computer systems. To give but one reason, many if not most programs today are reentrant, which means that (if set up properly by the operating system) one copy of a given program can be used by an arbitrary number of tasks which execute the same program. The savings from reentrancy are so substantial that nearly all existing operating systems organize themselves to exploit the capability.

Data Sharing Between Tasks of Like Endian

Figure 6B:
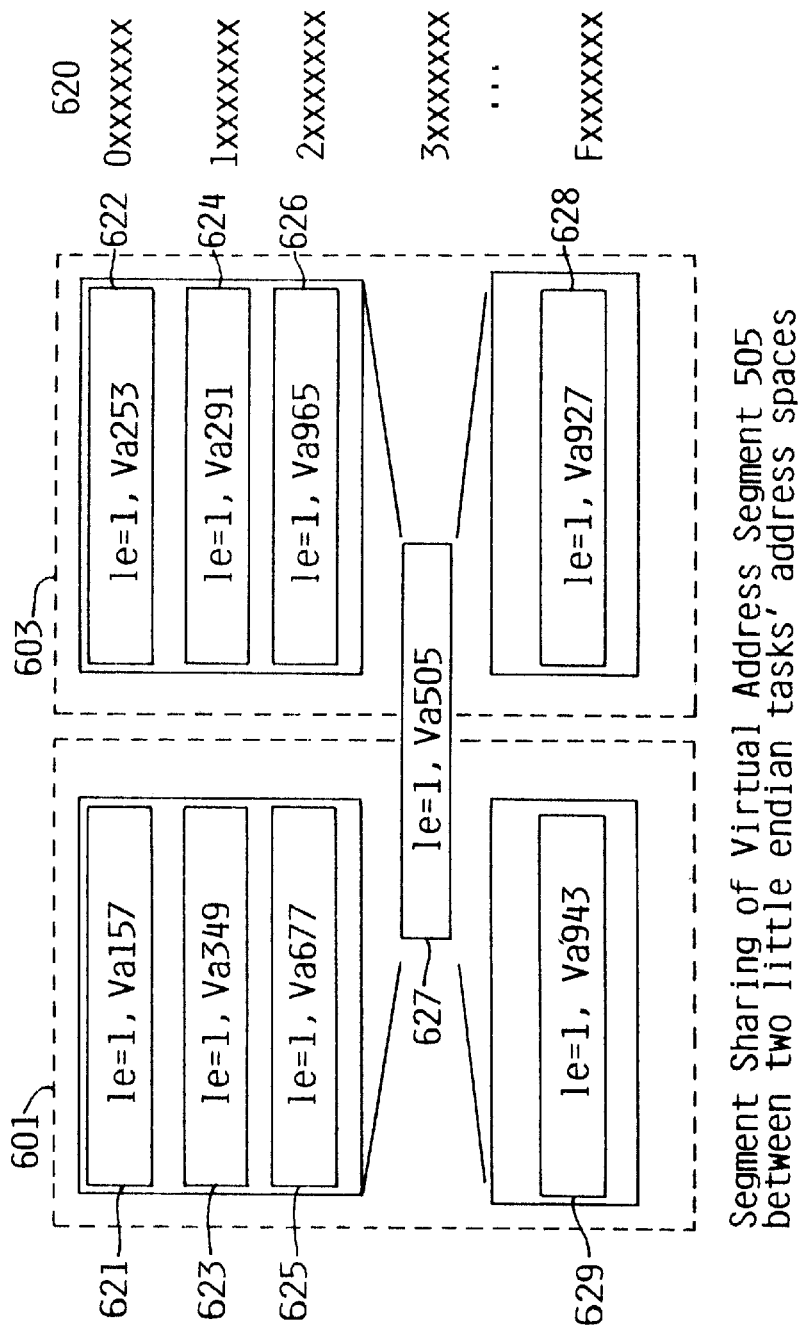
FIG. 6b is a block diagram showing segment sharing between tasks of like endian.

A more common memory architecture is shown in FIG. 6b. Each task behaves as if its address space consists of the entire address space defined by the processor architecture (2 to the 32nd bytes for a 601 PowerPC processor). However, while most of a task's code operates under this illusion, some of the task's code must continuously manage the fact that some subsets of the storage are shared between tasks. For the purposes of illustration, it is sufficient to describe a task's address space as consisting of up to sixteen virtual address segments. Thus, a given task can have an address space with up to 16 logically disjoint entities in it, some of which are unique to this task and some of which may be shared with all tasks in the system or with some cooperative subset of tasks.

Through a process called mapping, a given virtual address segment is associated with a given segment in the address space of the requesting task that has discovered the existence of some segment and is permitted to address it. Once the mapping is performed, the segment is part of the address space of the requesting task and can be accessed through the usual address translation mechanisms and thus perform ordinary data references.

Figure 6C:
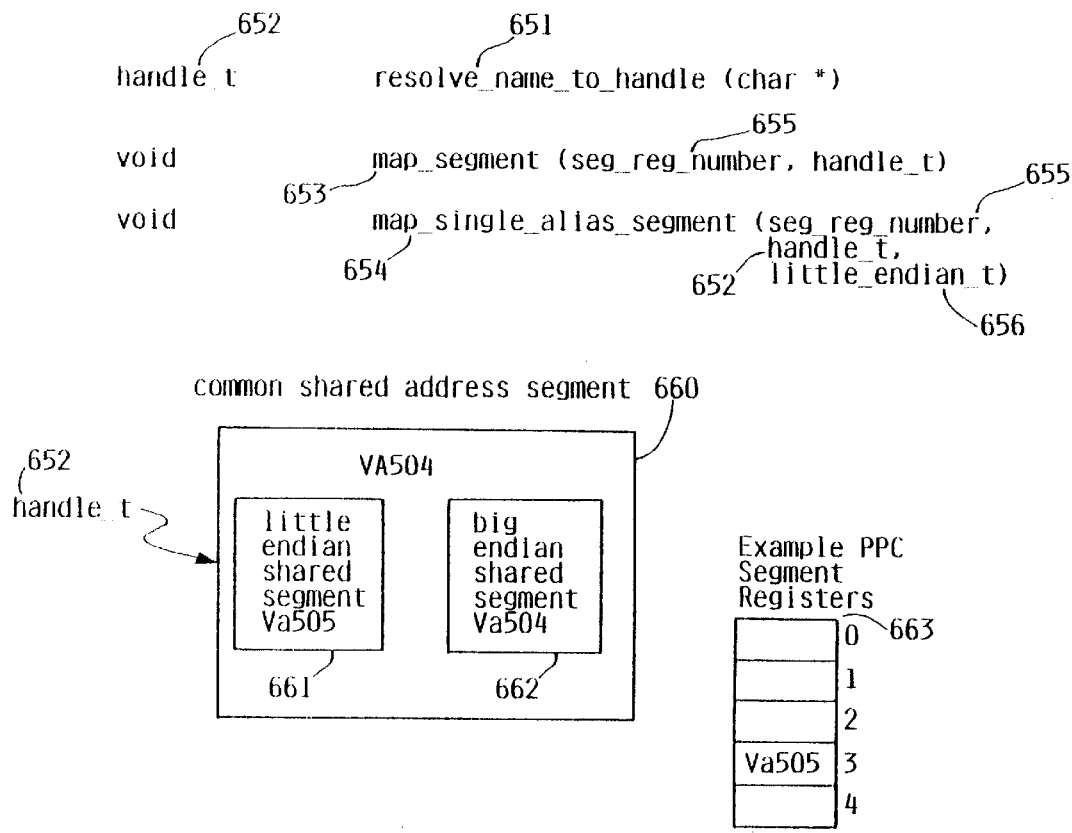
FIG. 6c shows mapping routine interfaces and a common shared address segment according to the preferred embodiment.

A typical mapping interface is shown in FIG. 6c. resolve__name__to__handle routine 651 takes a symbolic name and returns some integer value (called handle__t 652) in this case that represents "the segment." How this works is very system specific, but without loss of generality, assume a system-wide hierarchical name. The details are not essential here; it is enough to state that a name is associated with data that can be represented by an integer value and used in the mapping step.

Interface routines 653 and 654 presume a routine like 651 was invoked earlier. Their code varies based on what choices a programmer makes about mapping and which forms of aliasing are implemented (i.e., single or double aliasing, as win be described in the forthcoming paragraphs).

Both interfaces associate segment_reg_number 655 with passed handle_t 652. Note that in map_single_alias_segment routine 654, the programmer must also specify the endian of the underlying segment (i.e., that identified by handle_t). This is due to the fact that during single aliasing the tasks sharing the data must agree that the data will be in a particular endian. Single aliasing will be described in the forthcoming paragraphs.

PowerPC describes a 32 and a 64 bit virtual address architecture; the former has true segment registers, the latter segment tables. Those skilled in the art will readily extend this discussion, which is in terms of segment registers, to segment tables.

Interface routines 651 and 653 would be sufficient when the endians were the same between all sharing tasks (i.e., cross-endian data sharing was not required).

The memory architecture shown in FIG. 6b is entirely sufficient for data sharing between tasks if the operating system restricted memory accesses such that a given virtual address segment was always referenced by tasks operating in the same endian. For PowerPC processors, the data would always be correctly reflected (or not) and operations would proceed normally. In the example shown in FIG. 6b, address spaces 601 and 603 have been assigned to two little endian tasks. Each little endian task has virtual address segments dedicated to its own processing (e.g. private segments 621 or 622) and each little endian task shares virtual address segment 627. Virtual address segment 627 is referred to herein as a shared virtual address segment. Since in this scenario data sharing would only occur between tasks of like endian, the operating system would merely need to associate an endian bit in the segment's control structures for each segment. For the PowerPC architecture, this could be easily done when a segment was created or mapped by reference to the LE value in the MSR of the task which created or mapped the segment. However, this memory architecture would provide for a very limited mixed endian environment because while tasks could be dispatched in either endian, they could not directly share data across endians (i.e., across address spaces of unlike endian).

Data Sharing via Single Aliasing

During mixed-endian operation, a little endian task may well require access to data in a big endian virtual address segment and/or a big endian task may well require access to data in a little endian virtual address segment. The mechanisms of the present invention include what is referred to herein as a single aliasing mechanism. The single aliasing memory management mechanism is incorporated into operating system 165. An example memory organization is shown in FIG. 7a.

Unlike the memory organization shown on FIG. 6b, each virtual address segment is created without remembering the LE value of the creating task. Further, the single aliasing memory management mechanism maps segments into address spaces representing tasks in the opposite endian when requested to do so. Since in the preferred embodiment the "virtual address" of the segment is a standard PowerPC virtual address, it is linked into the addressability in the usual way the architecture requires. Accordingly, both the big endian and little endian tasks may now address and access the data in the shared segment. However, it should be pointed out that the accessing tasks must themselves account for the processor's internal representation of the data. The particular internal representation (i.e. reflected in the case of little endian and unreflected in the case of big endian) is determined at mapping time. In other words, the sharing tasks must agree as to which endian will be used when using the single aliasing version of shared addressing. However, as long as all sharing tasks agree (from the first page put in use to the removal of the last page in the segment), the actual endian for single aliasing can vary. That is, the endian of different page groups could vary, but a given group of concurrently shared pages must be in a single, fixed endian.

Figure 7A:
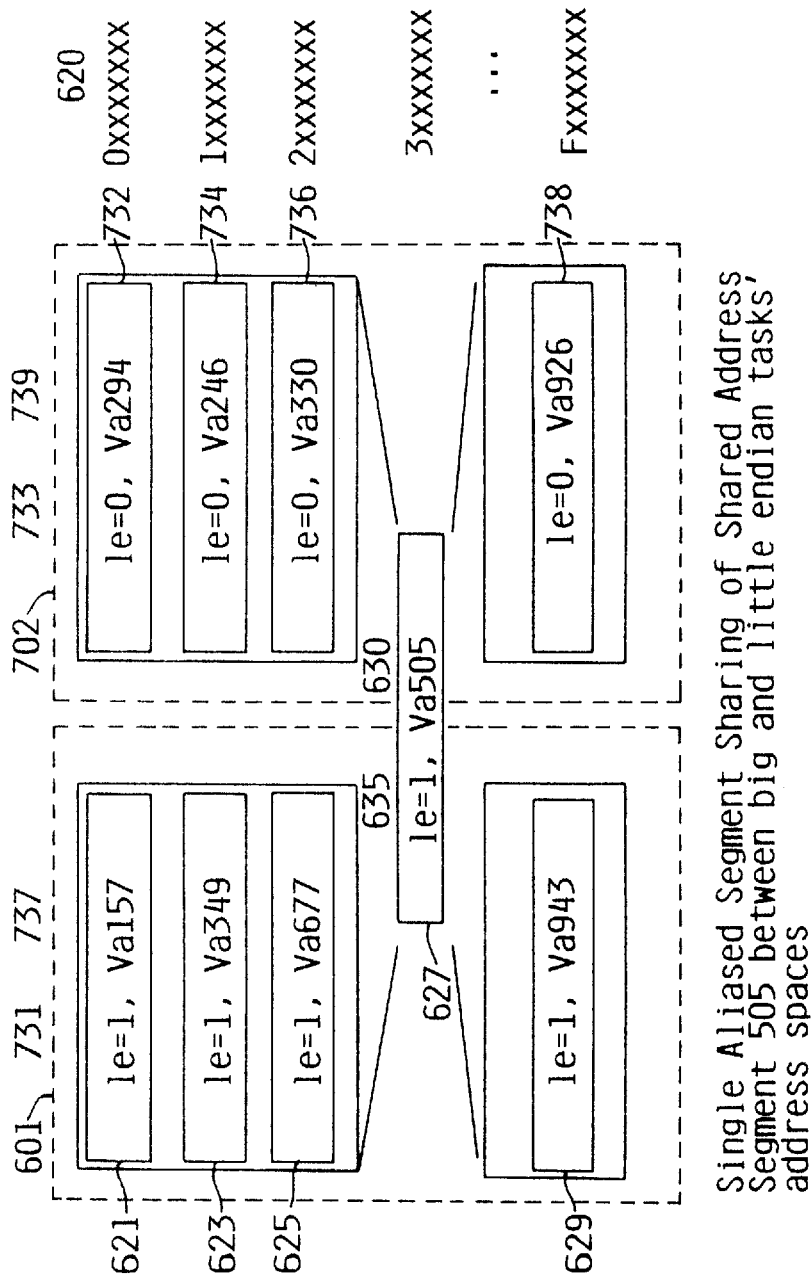
FIGS. 7a and 7b are block diagrams showing the single aliased form of segment sharing according to the preferred embodiment.

Referring now to FIG. 7a, it should be noted that shared virtual address segment 627 is a little endian segment that is now shown as being shared by a big endian task (i.e., the big endian task associated with address space 702). To accomplish this sharing between tasks of opposite endian, the single aliasing mechanism of operating system 165 maps the segment to be shared (i.e., shared address segment 627 in this case) into both address spaces using what is referred to herein as a common shared address segment. Common shared address segment 660 is shown on FIG. 6c. As shown, common shared address segments are made up of two shared virtual address segments (shown on FIG. 6c as shared virtual address segments 661 and 662). However, during single aliasing operation only one virtual address segment is shared (e.g., shared virtual address segment 627 in the example on FIG. 7a). Therefore, the single aliasing mechanism of operating system 165 uses only one of the two shared virtual address segments of the common shared address segment. (Both shared virtual address segments are used by the double aliasing mechanism of operating system 165, which will be discussed in the forthcoming paragraphs.)

Common shared address segments are denoted in the figures by the identifiers VAxxx (where xxx is a system-wide address). This is a slight abstraction of PowerPC, where the virtual segment ID (VSID) is either a 24 bit or 52 bit binary number (see FIGS. 61 and 69 of *The PowerPC Architecture*). Common shared address segments are represented and tracked by using this system-wide address. By convention, the low order segment address bit is zero, and this address is considered to have no endian. This is because common shared address segments can be used to map shared virtual address segments of either endian (i.e., for the single aliasing mechanism) or for segments of both endian (i.e., for the soon to be described double aliasing mechanism).

Note that much detail about how handle_t 652 is associated with common shared address space 660 is not given. Any suitable means can be used, including such means as a single pointer to shared address space 660 or, alternatively, an integer value which the operating system 165 derives an internal pointer or information about common shared address space 660 in some elaborate association function.

Those skilled in the art will also appreciate that mapping interfaces need not be so closely tied to the segmentation architecture. Structures similar to the common shared address segment 660 may be established for aggregates other than a whole segment and that the descriptions herein are readily extended to arbitrary mapping aggregations, since the restrictions on sharing, even in this description, apply to arbitrary storage pages collectively shared concurrently in a specific aliasing model. That is, even as described, the preferred embodiment permits different page ranges within a common shared segment to use either single aliasing or double aliasing.

As discussed, single aliased mapping requires a common shared address segment to be associated with a single shared virtual address segment of a given endian. If interface routine map-segment 653 is used to map a segment, the segment register is loaded with the common virtual address segment address, but with the low order bit set to the value of the caller's LE 129. If interface routine map_single_alias_segment is used to map a segment, the segment register represented by seg_reg_number 655 is loaded with the common virtual address space's virtual segment address, but with the low order bit set to the value of the parameter little_endian_t 656, where 1 means little endian and zero means big endian.

To set up the memory organization shown on FIG. 7a, tasks of either endian would first invoke resolve_name_to_handle routine 670 to associate the common shared address segment with handle_t 652. Big endian tasks would then execute routine 674, while little endian tasks would execute either routine 672 or routine 674. Both sets of calls resolve to common shared address segment VA504 660, and both end up with Va505 in segment register 3, thereby providing the required agreement about endian. Since paging operations will use Va505, the pages will be processed under little endian rules and hence be doubleword reflected.

Vaxxx is a convention for shared virtual segments similar to VAxxx for common shared segments, except the low order bit of the number indicates the endian of the segment.

After the mapping has occurred, the sharing tasks can proceed to access the shared data. However, since the processor of the preferred embodiment is a conventional, two-step bi-endian PowerPC processor, big endian tasks must themselves account for the fact that the shared little endian data is in its double word reflected format; in effect, big endian data at the wrong offsets. Therefore, when using the single aliasing mechanism to make a cross endian access to little endian data, the programmer's big endian code must manually perform the address modification while accessing little endian data (that is, perform the operations of FIG. 3b on aligned data and other, similar known operations (not described) on unaligned data). In effect, the programmer must "manually" account for the fact that the data is in double word reflected format.

For example, consider a big endian program performing under the task associated with address space 702 (i.e., as shown on FIG. 7a) and wishing to access shared virtual address segment 627 within shared virtual address segment Va505. Virtual address segment 627 is a little endian segment and its pages are managed as previously described for little endian data. It is thus seen in double word reflected format when referenced by a big endian program executing references to any offset in address space 702's mapping of Va505 (accessed, as in address space 601, via mapping it into its "effective" address range 30000000 through 3FFFFFFF hexadecimal addresses).

By contrast, little endian tasks wanting to access little endian data (e.g., the task associated with address space 601) will see normal little endian data and may accordingly make conventional references. This is because, as before, all pages associated with virtual address segment 627 have their LE bit equal to 1 and are in the expected double word reflected format for little endian pages as required by the PowerPC architecture of the preferred embodiment. This is due to the propagation of the value of the "le" bit 635 into every page table entry as each page is being created (whether originally at the behest of a little endian program executing under a task associated with address space 601 or a big endian program executing under a task associated with address space 702).

Figure 7B:
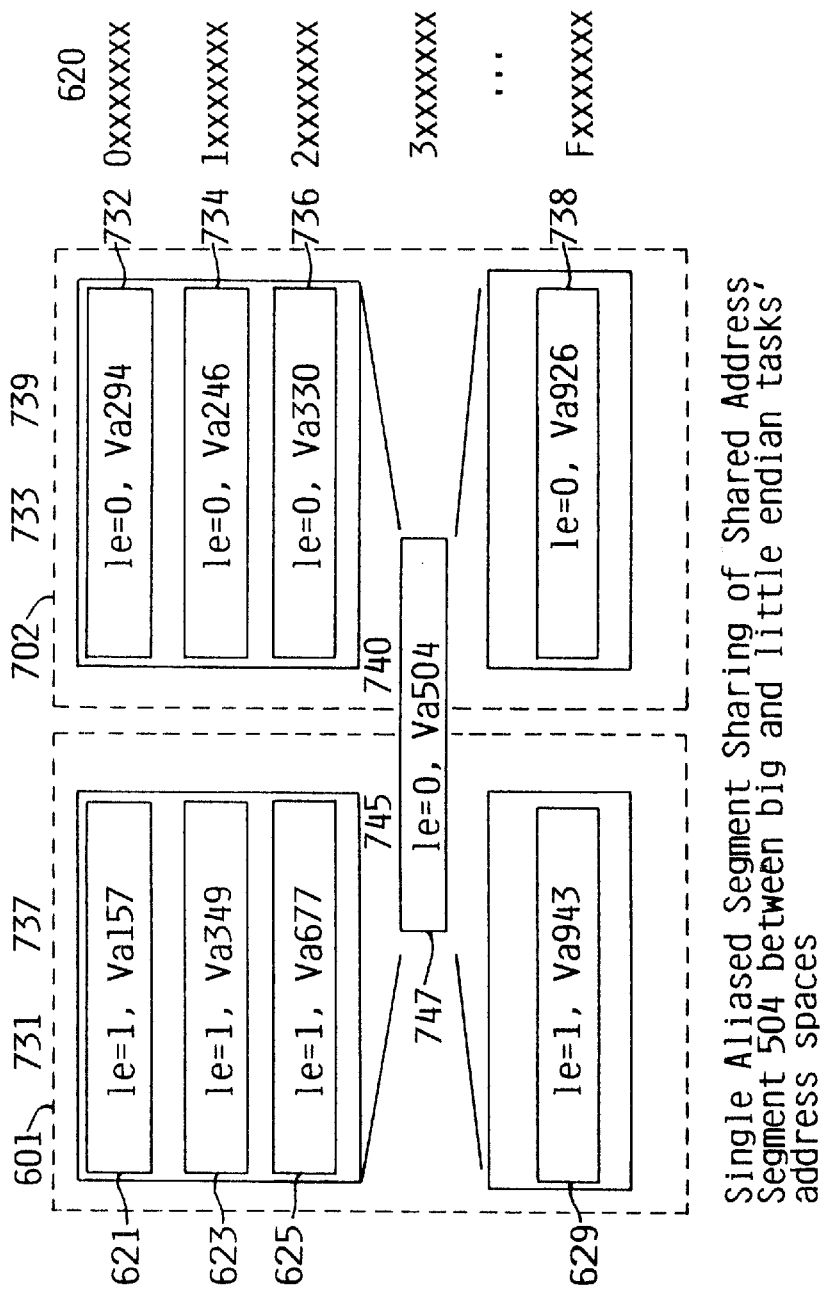

Now consider FIG. 7b, which again shows address spaces 601 and 702, except that virtual segment 747 is shown to be mapped as a big endian segment instead of as a little endian segment. This represents the same common shared virtual address space (see common shared address space 857 on FIG. 8a), but the sharing tasks have elected to share big endian data rather than little endian data.

This requires a different mapping sequence. First, any active pages in the shared range in little endian format (i.e., in reflected format) must not exist in main memory 109. In most scenarios, this is no problem as sharing would tend to be in a single, chosen endian anyway. Once any little endian pages were cleared, mapping could be done. The big endian task may execute routines 670 and 672 or routines 670 and 676. The little endian tasks must execute routines 670 and 676. Note that both task's segment register 3 now contain Va504, which creates the required endian agreement.

This latter example has reversed the "endian" situation for the shared data. The changed value of the "le" bit 745 (i.e., LE=0) of shared segment 747 would cause operating system 165 to page all of the segment's pages in as big endian data (i.e., in unreflected form), regardless of whether the little endian task associated with address space 601 requested the data or whether the big endian task associated with address space 702 requested the data. Thus, tasks executing big endian programs under address space 702 see ordinary big endian data and make conventional references. However, by symmetry, the little endian programmer must manually "undo" the address modification to be performed by address modification circuitry 119. Since the modification is the symmetric exclusive OR function, the end result is no net modification. So, both programs make the same modifications and access the correct data at different offsets when accessing data whose "le" value in the virtual address segment is different from the value in their MSR LE bit (129).

Data Sharing via Double Aliased Addressing

Those skilled in the art will readily appreciate that while the single aliasing mechanism of the preferred embodiment is direct and performs well, cross endian data references introduce complexity into the system. In particular, the aforementioned manual process of managing the double-word reflection is a new model of cross endian reference. In some cases, it is desirable to receive data of the "other" endian in its "true" format (i.e., unreflected in the case of little endian data being accessed by a big endian task) without having to understand and manage the processor's internal data representation. In this variation, cooperative tasks format the data in some predetermined endian (e.g. a "Windows Write" word processing file would have many integers within stored in little endian format) and the receiving task, which has to know the intimate details of the data (e.g. how a "Windows Write" word processing file is laid out) would then have the added burden of manually reversing each integer. In other words, both big and little endian tasks somehow see "true" endian data in an agreed to canonical form for each field and one side or the other changes the intrinsic endian to the different local endian "by hand" on a field by field basis, without having to manage the processor's internal representation of the data.

The double aliasing mechanism of the present invention allows server code to obtain and deliver data in the expected format of the client task while still using the same model for reading data from the outside world as for passing along data discovered in the shared storage in the local machine.

Figure 8A:
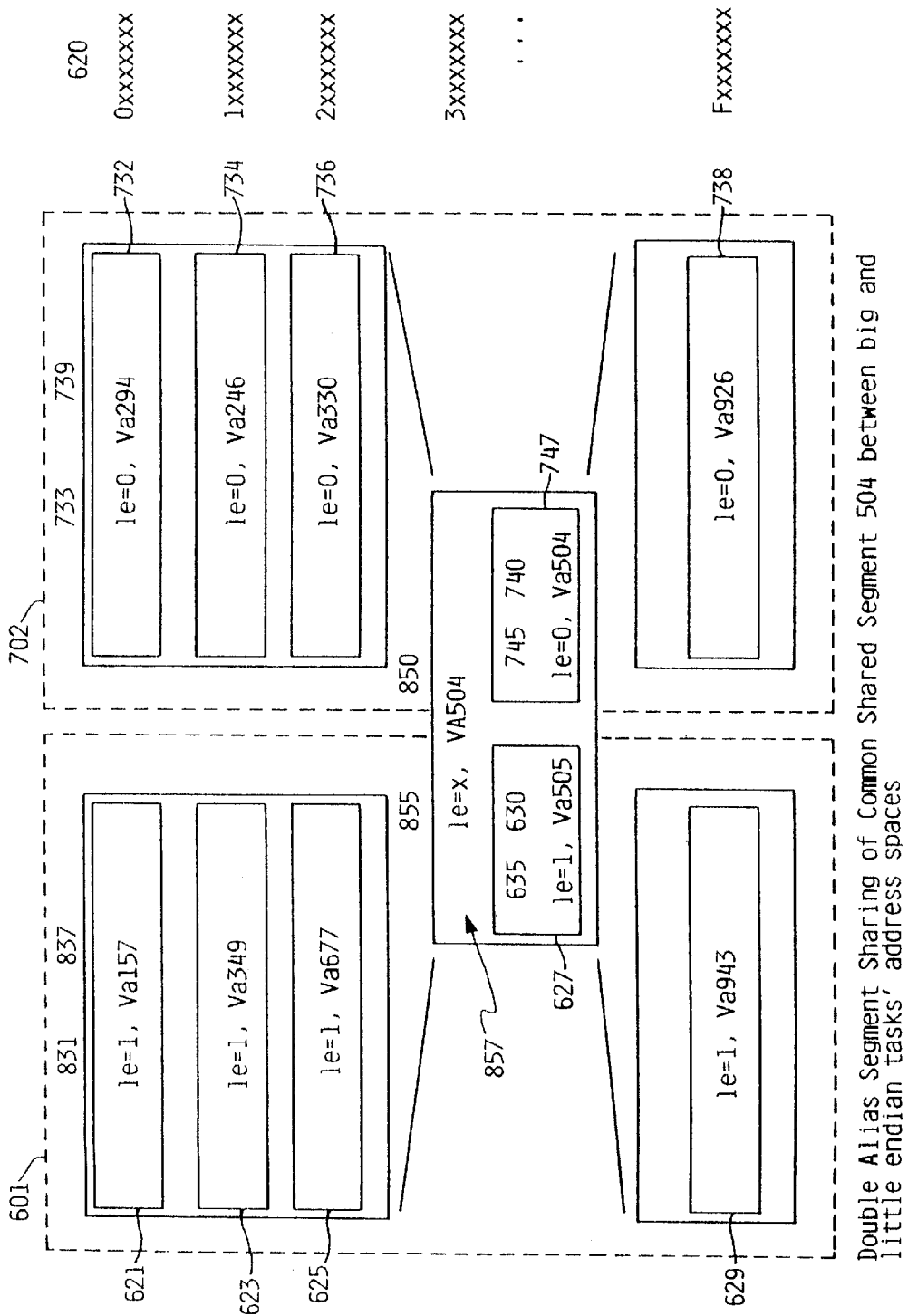
FIGS. 8a through 8c are block diagrams showing the double aliased form of segment sharing according to the preferred embodiment.
Figure 8B:
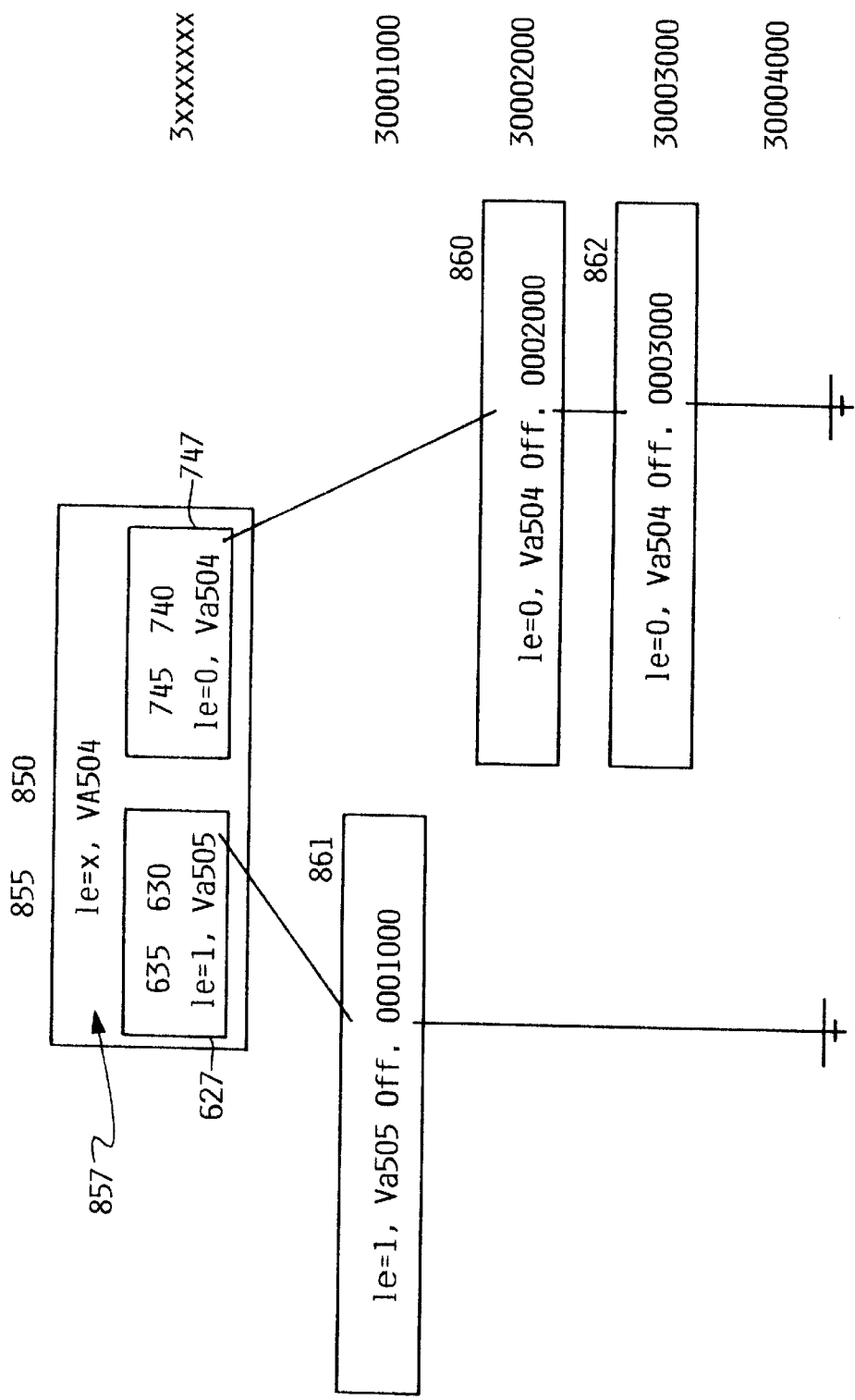
Figure 8C:
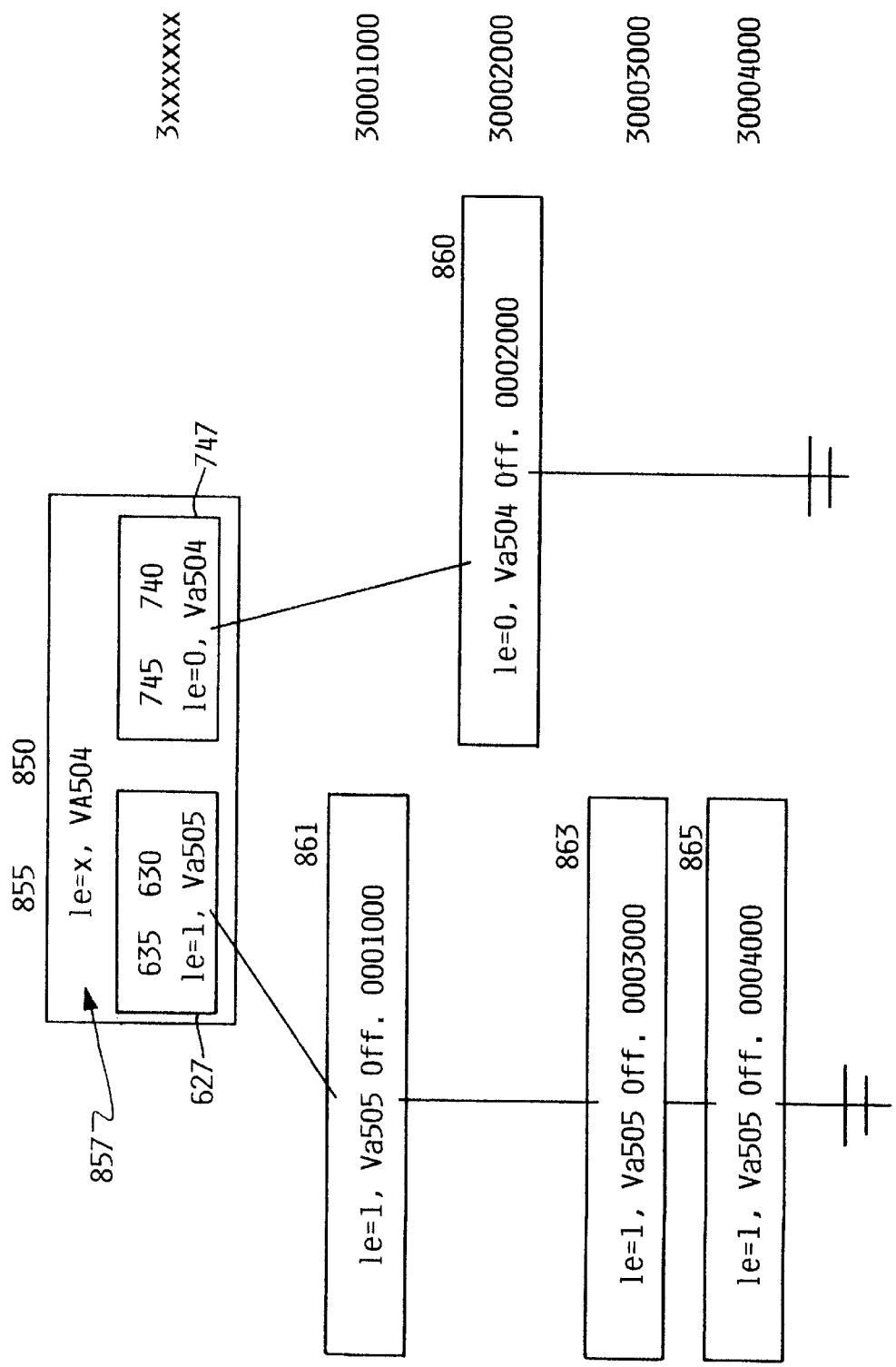

FIGS. 8a through 8c show examples of how the double aliasing mechanism is used to manage memory. The double aliasing mechanism is an extension to the single-aliasing mechanism, which was described in the text associated with FIGS. 7a and 7b. As such, the double aliasing mechanism is also incorporated into the memory management mechanisms of operating system 165. FIG. 8a shows that the double aliasing mechanism of operating system 165 provides for endian-oriented virtual address segments, similar to those provided for by the previously described single aliasing mechanism. Note, for example, that task address space 601 contains virtual address segments 621, 623, 625, and 629, each having been marked as little endian (i.e., le=1); whereas task address space 702 contains virtual address segments 732, 734, 736, and 738, each having been marked as big endian (i.e., le=0). However, instead of sharing a lone shared virtual address space amongst multiple tasks, the double aliasing mechanism provides for more direct usage of the common virtual address segment. Unlike the single aliasing mechanism, which uses only one shared virtual address segment and thereby requiring the sharing tasks to have explicit awareness of the processor's internal representation of the data, the double aliasing mechanism uses both shared virtual address segments of a common virtual address segment, thereby allowing tasks with different endian expectations to access the data without having to understand and deal with this internal representation.

To map both the shared virtual addresses segments of a common shared virtual address segment, each task (big or little) would execute routines 670 and 672 of FIG. 6C. Note, however, that the single aliased rule of little endian agreement in violated. Little endian task's segment register 3 now has Va505, big endian tasks's segment register now has Va504.

So, as shown in example common virtual address segment 857, each common address segment has two constituent virtual address segments, shown respectively as little endian shared virtual address segment 627 and big endian shared virtual address segment 747. By arbitrary convention, common virtual address segment 857 has a virtual address corresponding to the big endian form of one of its constituent virtual segment addresses (i.e., VA504 in this case). From the perspective of big endian programs 155 and little endian programs 160 operating system 165 tracks common virtual address segments as if they were single, system-wide segments. Internally, however, operating system 165 tracks individual pages as members of actual shared virtual address segments with their individual LE bits managed as previously described. For example, operating system 165 would track common shared address segment 857 via virtual address Va505 for virtual address segment 627 and via virtual address Va504 for virtual address segment 747 in its page fault tables. This falls out from the contents of the segment registers and the mapping sequences.

Carrying this point further, operating system 165 manages each page in main memory 109 of the common virtual address segment such that at any one time a given page can only be addressed under either the actual big endian virtual address segment (e.g., Va504) or under the actual little endian virtual address segment (e.g., Va505). Note that in double aliasing, the low order bit of the virtual address in the segment register is identical to the MSR LE 129 value for that task. That is to say, if the page fault occurs on a common virtual address segment, the corresponding segment register of processor 101 will have been loaded with the particular virtual address corresponding to the MSR LE bit. Thus, when a task has its double aliasing mapping established, it will always use the virtual address "side" corresponding to its MSR LE bit. Note also that the segment registers are part of the task state in the TCB and reloaded identically as before whether the segment is strictly local/private to the task, a single aliased shared virtual address segment, or the correct "side" virtual address segment of a common virtual address segment. This implies that all three segment conventions can be used by various segments of a given task; the only restriction is that there be only one convention used per segment register for any one usage of that associated segment.

Note also that very little special processing is necessary to extend the single aliasing mechanism to provide double aliasing capability because the one-to-one mapping rules mean that the "le" value of the segment undergoing a page fault is directly revealed by the virtual address reported by the page fault process, regardless of whether the page was part of a strictly private virtual address segment, a single aliased shared virtual address segment, or "this task's side" of a common virtual address segment (i.e., double aliased).

Further still, nonshared segments can be easily organized and mapped under these rules. In the simplest form, common shared address segments could be set up, but sharing prevented. Private segments would be mapped by their sole owner using calls similar to routines 670 and 672, the main difference would be that the character string calls for some kind of local storage via some form of special name and that seg_reg_number 655 of FIG. 6c will vary. Note that because mapping routine 672 is used, the segment le bit will always be equal to LE 129 of the invoker.

Finally, note that the only interface change for a typical system would be mapping routine 654. Interfaces like mapping routines 651 and 653 are commonplace in the art and since common shared address segment 660 is an internal implementation structure, interfaces from existing systems that do not wish to employ single aliasing migrate easily.

However, as noted previously, the double-aliased environment raises one added page fault processing possibility. This being that the page that was not successfully translated (i.e., faulted upon) is actually physically present in main storage, but undergoing use by tasks in the alternate endian. Now, please consider FIG. 8b and assume for the purposes of explanation that effective address 30004000 was faulted on by the task associated with address space 601 of FIG. 8a. Since the page is wholly absent, the page will show up on the "little endian side" of the common virtual address segment. But, consider effective address 30003000. If a little endian task faults on this page, the virtual address of the page fault is subjected to an exclusive. Or operation on the low order bit of the segment address. By so doing, the virtual address is converted to the big endian format of its "counterpart" virtual address in the common virtual address segment. Using this address to re-check, the page address translation mechanism of operating system 165 will discover that effective address 30003000 is present in big endian form.

The value of the double aliased mechanism is that, by managing the doubleword reflection in the page fault pathways, the whole problem of managing single alias-style "cross-endian" references largely evaporates for the referencing programs. Storage is always accessed in one's "native" form (unreflected for big endian access, reflected for little endian access). Therefore, there is no difference between data sourced locally and data read in off of external media. If the data is intrinsically in the alternate endian, programming copes with it the same way it does on a conventional monoendian system, because all double aliased data is always seen (by the application program) in its own expected endian format. That is, in the reflected form that it expects.

As has been shown, a double aliased memory management mechanism provides certain benefits that are not found in a pure single aliased mechanism. Namely, the tasks themselves are not burdened with the responsibility of dealing with the processor's internal representation of the data. However, there is nonetheless value in having an operating system, such as operating system 165, that provides both single and double aliasing capability. Some advantages are enumerated below.

1. Each time a reference to the same page is made by the alternate endian, a page fault occurs and an entire page (4096 bytes in the case of PowerPC processors) must be processed. This is cheaper than a page fault off of auxiliary storage, but is not inexpensive. Some server environments might know that the page fault is a sure thing and so arrange for single aliasing instead, which enables the page fault to be avoided and also for a possibly much smaller amount of data to be copied using the doubleword reflection rules directly in the server.

2. Once a given page is undergoing DMA for any device whatever, it will be "stuck" in its current endian until DMA completes. If the double aliased segment has that particular "stuck" page referenced by a task in the opposite endian, there is a potential for long, unexpected delays of that opposite endian task to occur, since the DMA may be waiting a very long time for a low speed device.

It is also true that, internally, the operating system must use either single aliasing or the unrelocated ("real") address references from time to time that are identical in programming model to single aliasing.

However, for naive servers, the double aliasing model will work extremely well in terms of bringing existing monoendian servers into a mixed endian environment, since it need only reference its own control information in its own endian (formatted in the server's endian by clients of either endian as would be normal practice for a networking version of the same interfaces) and simply treat the rest of the information as a bucket of bytes. The page fault handlers, coupled with appropriate mapping choices, will then sort out the reflections when and if needed.

Data Sharing During Mixed-Endian Operation

Figures 1, 9A:
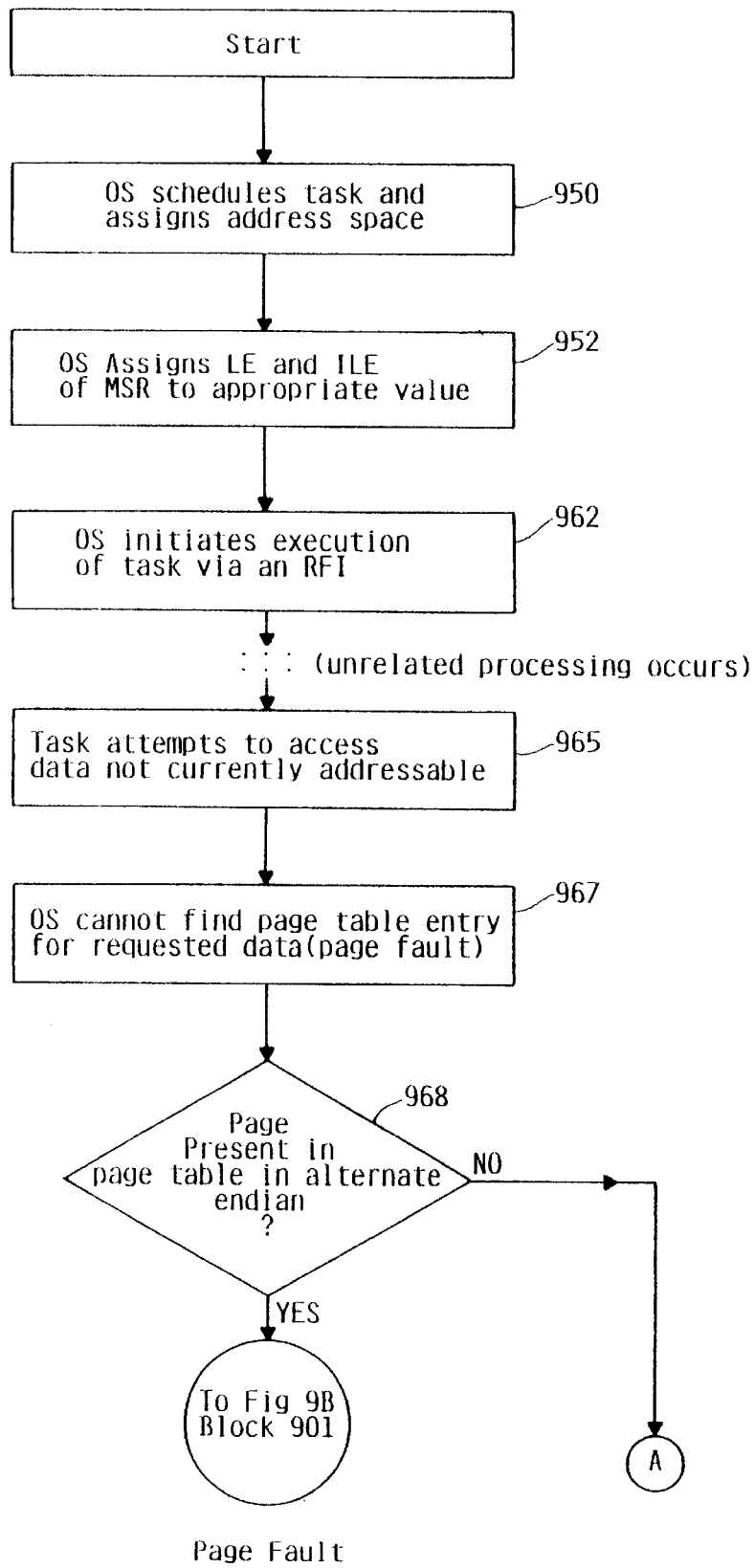
Figures 2, 9A:
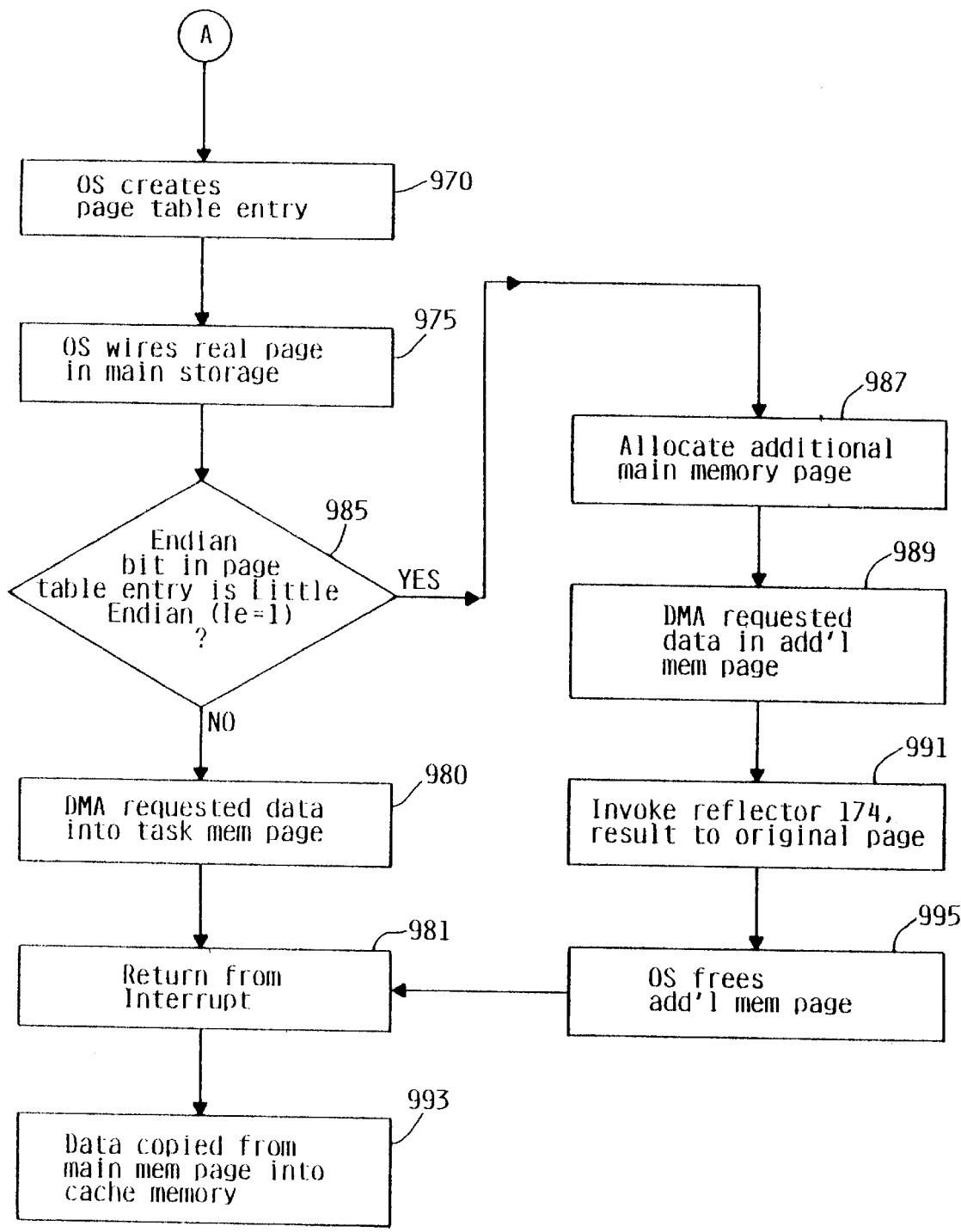
Figure 9B:
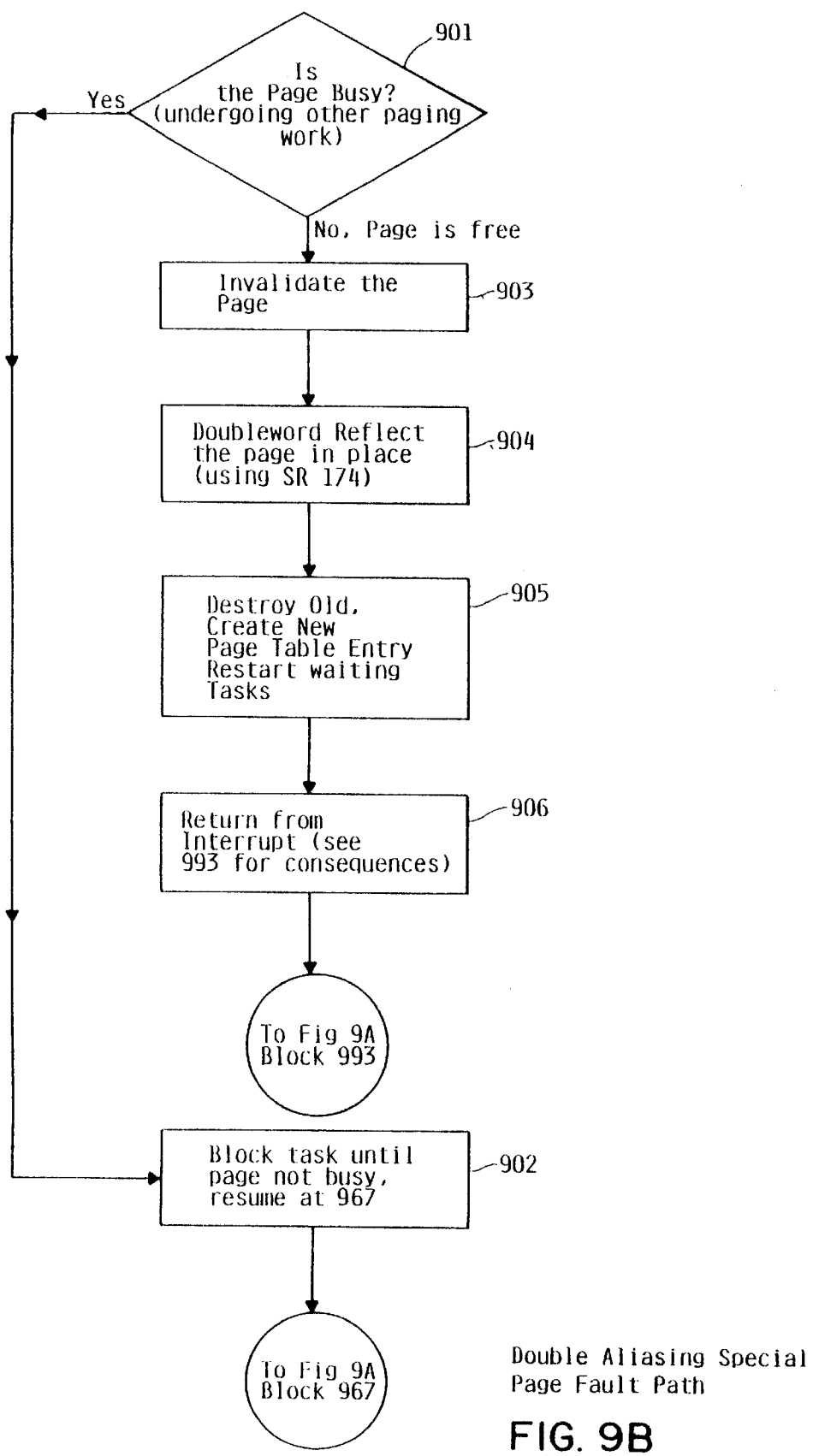

FIGS. 9a through 9c will now be used to describe how operating system 165 provides single and double aliasing capability during a page fault. FIG. 9a is a logic flow diagram of how the mechanisms of the present invention carry out steps of the preferred embodiment. FIG. 9c is an example data flow diagram that shows example results of the steps taken by the mechanisms described in FIG. 9a for single aliased addressing. As has been mentioned, single-aliased addressing is an important capability of operating system 165.

Since page fault processing is well-known in the art, only steps essential for the present invention are described.

In block 950, operating system 165 schedules a previously created task for execution on processor 101 and assigns an address space to the task. In block 952, prior to any fetch or data store operation, operating system 165 creates the particular task and its associated task control block (TCB). Since those skilled in the art are familiar with task creation, the details of such steps are not set forth herein, except to note that correct LE and ILE bits are set in the TCB's copy of MSR 105. Operating system 165 then initiates execution of the scheduled task [block 962]. Because the task scheduling function of operating system 165 is itself an interrupt handler of sorts, the task scheduling function initiates execution of the task via a Return From Interrupt instruction (RFI). An instruction such as RFI is known in the art to be the last instruction of an interrupt handler. The RFI of the preferred embodiment includes two operands. The first operand contains the new values of MSR 105 from the TCB and the address within the task that is to be executed first when the interrupted task (i.e., the task to be scheduled in this case) resumes execution.

While not shown between blocks 962 and 965, the software will perform the previously described mapping operations prior to attempting to access shared or other segments.

For the purposes of explanation, assume that the requesting task attempts to access data currently stored in auxiliary storage via auxiliary storage interface 140 [block 965]. Under this assumption, the running user-state task, when referencing the data, will suffer a page fault interrupt. Since operating system 165 is careful in the aforementioned RFI to get ILE bit 127 to the endian value of operating system 165, it gets control in its own endian, with the values of old MSR 105, the interrupted instruction's address, and the address causing the page fault all available as per PowerPC architecture requirements. When operating system 165 attempts to associate the virtual address presented by the requesting task (i.e. the address of the requested data) with one of page table entries 175 (i.e., by determining that the presented address is within a particular memory page), it determines that the requested information is not currently present in main memory 109. Therefore, a page fault is confirmed in block 967. An additional check is made in block 968 to determine, by an XOR operation to the low order bit of the virtual segment address, whether the page currently belongs to storage formatted for the alternate endian. The "yes" case of this branch will be described in the discussion of FIG. 9b. At this point, assume that operating system 165 determines that the page does not currently belong to storage formatted for the alternate endian. Therefore, not only is a page fault confirmed, it is confirmed that the page under consideration is wholly absent from main memory 109. Operating system 165 then assigns a page of main memory 109 to the requesting task and creates an appropriate page table entry [block 970]. Amongst other things, the page table entry contains the virtual and real addresses of the memory page and the endian bit. The endian bit of the page is incorporated in the page table entry by operating system 165 through reference to the low order bit of the virtual address segment. Note that this is not a reference to the MSR's LE bit, but to the virtual address segment involved. Once this step is complete, operating system 165 "wires" or locks the page into main memory 109 such that it cannot be swapped out before the data access can complete [block 975].

In block 985 of FIG. 9a, operating system 165 determines whether the requested page is a big or little endian page. At this point, the mechanisms of the present invention perform different operations depending on the endian of the requested page. FIG. 9c shows an example of how big and little endian data is respectively loaded for big and little endian pages. Consider first the example of a big endian task requesting big endian data 914. Big endian data 914 is shown to be stored in auxiliary storage as HEX 000C350 F1F2F3F4. Since block 985 is answered negatively by checking page table entry 921, operating system 165 proceeds to block 980 where it would cause big endian data 914 to be copied (i.e., by DMA) directly into memory page 909 of main memory 109.

Once this step is complete, the interrupted instruction is again resumed via an RFI instruction [block 981]. The interrupted instruction will typically immediately attempt to access the recently "paged-in" data. This causes big endian data 914 to be copied directly into a cache line of one of cache array elements 124 or 125 [block 993].

By contrast, consider now the example of little endian data 915 fetched by a little endian task. Little endian data is shown on FIG. 9c as HEX 50C30000 F2F1F4F3. Little endian data 915 is the little endian form of big endian data 914 (i.e., each piece of data means the same thing, they are just stored differently). Processing from 950 to 975 is similar to the big endian case, except the TCB and the address space, are marked little endian and the page table entry of block 970 is accordingly set to little endian because its lower order segment address bit is little endian. In this example, block 985 is answered affirmatively by checking page table entry 922. Therefore, operating system 165 proceeds to allocate additional memory page 906 [block 987]. Operating system 165 then causes little endian data 915 to be copied directly (i.e., by DMA) into additional memory page 906 [block 989]. Operating system 165 then invokes reflector 174 in block 991. Reflector 174 performs a doubleword reflection on little endian data 915, per the PowerPC rules described in FIGS. 3a through 5 and the accompanying text, moving from page 906 directly into main memory page 908 [blocks 991 and dashed line 916]. Operating system 165 then frees additional page 906. (Note that data 915 in page 908 is in reflected form.) At this point, an RFI instruction [block 981] is similarly performed and control returns (in the correct endian) to the interrupted little endian task. Again, the task will typically execute the interrupted instruction immediately upon resuming execution. This causes data 915 at 908 to be copied into a cache line of one of cache array elements 124 or 125 [block 993], and accessed under the rules of FIG. 3b by processor 101.

Thus, the data is available in cache memory 103 for access by the requesting task. Note, however, that the respective data appears in cache memory 103 in the appropriate format (i.e., reflected in case of little endian data and unreflected in the case of big endian data), regardless of whether the running task happened to be a big endian or little endian task.

FIG. 9b shows the special processing logic for the double aliasing mechanism of operating system 165. Since those skilled in the art are familiar with general page fault processing, only the essential steps are shown on FIG. 9b. Assume here that block 968 (of FIG. 9a) was answered affirmatively. This being the case, processing continues at block 901 of FIG. 9b. In block 901, a check is made to see if someone else "got here first" and is altering the state of the page using either the means of FIG. 9a or FIG. 9b (an ordinary page in might be underway based on a page fault to the other endian's task on the same page offset in the common virtual address segment). If so, the current page fault blocks (gives up the processor) in 902 and waits until that "someone else" reaches block 905 and restarts the task, which resumes processing at block 967 since the state of the page may have wholly changed. If, however, the page is free, processing continues in block 903. The page is invalidated (made unavailable for further hardware address translations). At block 904, the doubleword reflection process (reflector 174) is given control to reverse each doubleword in the page in place. In block 905, the revised page table entry using the new virtual address is constructed and the page is made available for hardware address translation again (and, any waiting tasks are made runable again). In block 906, the Return From Interrupt instruction is executed and control logically resumes at block 993; from this point, the discussion is identical to FIG. 9a.

Note, too, that the discussions of FIG. 9a through 9c in terms of the I/O management of the page fault is likewise independent of whether single or double aliasing is used. Once the page table entry is marked, the I/O bus management and the initial reflection (if one is needed) is properly handled whether the data is a strictly private segment, a single aliased segment, or a double aliased segment, and the code involved doesn't have to know or care which is which; it just has to respect what is in the page table when I/O is to commence and ensure (as it must for DMA control reasons in any event) that the state of the page cannot change.

I/O management of the page fault works independently of the whether the single or double aliasing mechanism is used because: 1) private segments are always accessed in the endian of the task owning the address space, 2) double aliased segments are always accessed in the endian of their own task, just as it they were private address segments, and 3) single aliased segments are delivered in the agreed to endian and the cooperating programs are responsible for managing cross-endian data references.

Note that while page fault processing has been described in detail, those skilled in the art can readily extend the description herein to other paging operations such as a page out or to conventional I/O processing where it is agreed that the internal reflected format must not appear on an external I/O bus or other I/O media. Likewise, while DMA was described, other forms of I/O, such as "Programmed I/O" are likewise readily added by those skilled in the art to the description herein.

Interrupt Processing

As noted, the LE bit is always set if the endian of the current software task is little endian, and is always cleared if the current software endian is big endian.

Upon initialization, computer system 100 begins in a known endian. During initialization, the operating system typically sets ILE bit 127 to indicate the endian required by interrupt handler 171 (i.e., whether interrupt handler 171 is a big endian task or a little endian task). ILE bit 127 is required for interrupt handling because processor 101 may be required to handle an interrupt at any time. During a context switch from a current software task to interrupt handler 171, a problem arises if the current software task is running in an endian which is different from that of interrupt handler 171. During the context switch, control is atomically passed from the current software task to interrupt handler 171, and processor 101 must therefore also atomically change whether or not data endian conversion is to be performed. ILE bit 127 of the present invention allows the processor to correctly interpret data in main memory during a context switch while interrupt handler 171 has control of processor 101.

Figure 10:
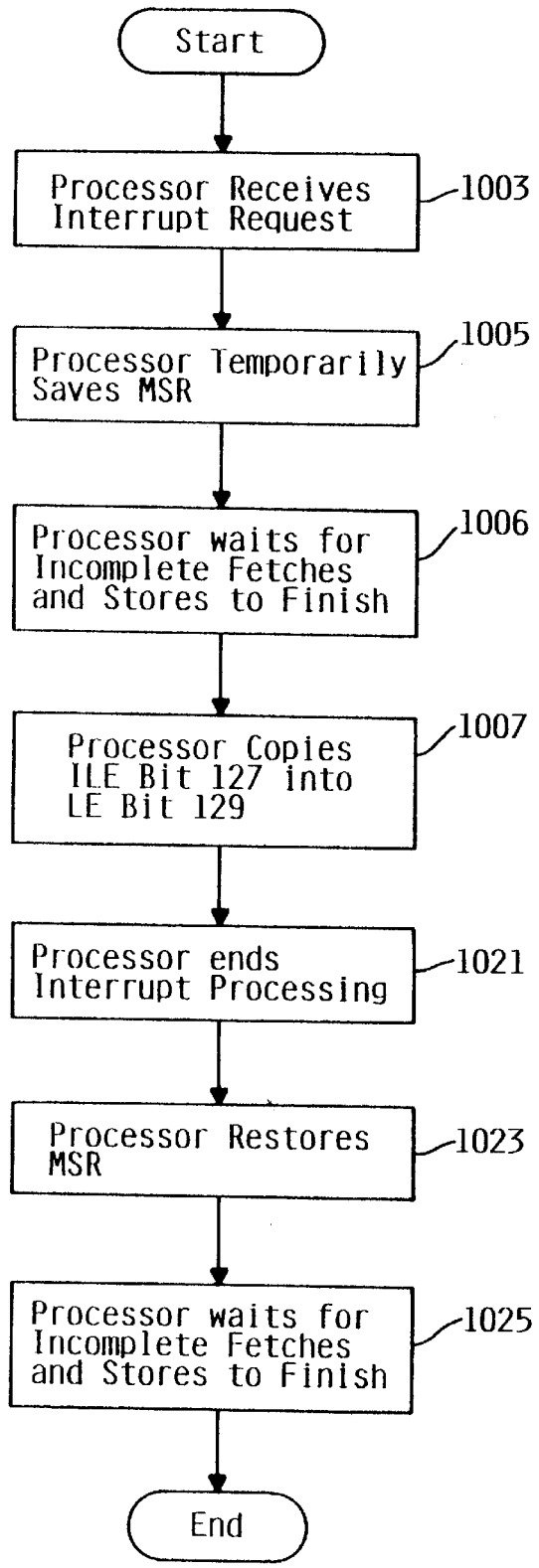
FIG. 10 is a flow diagram showing the interrupt processing of the preferred embodiment.

A preferred interrupt processing method for the mixed-endian computer system of the present invention is shown in FIG. 10. Processor 101 receives an interrupt request at 1003. As part of the context switch, MSR 105 is saved in a temporary location [block 1005]. In highly pipelined machines, data fetches and stores may have been successfully translated, but actual processing (e.g., see 993 of FIG. 9a) may still be pending for one or more operations. If so, processor 101 waits for such operations to finish [block 1006]. ILE bit 127 is copied to the LE bit 129 [block 1007]. Note again that any prior memory operations must have completed before ILE bit 127 is then copied to LE bit 129, and then the new value of LE bit 129 must control subsequent memory fetches. In other words, the value change of LE bit 129 is atomic. This is similar to interrupt handling for other typical interrupts commonly processed by current processors, except for the critical observation that designers designing to bi-endian and not mixed endian rules may deliberately or accidentally design the processor in such a way as to fail to meet these mixed-endian requirements on some pathways. A reliable mixed-endian computer system must ensure that all pathways and cache optimizations meet the aforementioned atomicity requirements; a bi-endian need only meet these requirements for a single, well-defined interrupt. Once the interrupt routine is running, fetches and stores occur as described above using the new value of LE bit 129 (i.e., as described in FIGS. 9*a*–9*c*).

Upon completion of interrupt processing [block 1021], MSR 105 is restored [block 1023], processor 101 waits for incomplete fetches and stores to complete [block 1025], and execution of the current software task continues at the point before the context switch. As described above, any change of LE from its old value to its new value must be atomic. It is assumed that there is a return from interrupt instruction which restores the saved MSR, and atomically resumes from the interrupt processing of the interrupted instruction.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer system comprising:

a conventional bi-endian processor, said processor being used to execute a plurality of tasks, said tasks including big endian tasks and little endian tasks;

memory, said memory being divided into a plurality of storage apprepates, said plurality of storage aggregates containing data, said data including big endian data and little endian data, said plurality of storage aggregates including markings, said markings indicating whether said storage aggregates contain data formatted as big endian data or contain data formatted as little endian data, said memory comprising big endian programs and little endian programs, said big endian programs executing as said big endian tasks and said little endian programs executing as said little endian tasks, said tasks executing on a task-for-task basis directly on said conventional bi-endian processor;

a memory management mechanism, said memory management mechanism using said markings to allow said big endian programs to share said big endian data with said little endian programs.

2. The computer system of claim 1, wherein said memory management mechanism uses said markings to allow said little endian programs to share little endian data with said big endian programs.

3. The computer system of claim 1, wherein said memory management mechanism uses said markings to allow said big endian programs to share big endian data with said little endian programs without said little endian programs having to understand how said conventional bi-endian processor represents said big endian data internally.

4. The computer system of claim 2, wherein said memory management mechanism uses said markings to allow said little endian programs to share little endian data with said big endian programs without said big endian programs having to understand how said conventional bi-endian processor represents said little endian data internally.

5. The computer system of claim 2, wherein each of said markings are used by said memory management mechanism to determine whether to perform a double word reflection on data contained within a storage aggregate such that a program of one endian type can access data that is formatted for programs of an alternate endian type.

6. A computer-implemented method for sharing data between big endian programs and little endian programs, said big endian programs executing as big endian tasks, said little endian programs executing as little endian tasks, said big endian tasks and said little endian tasks executing on a processor on a task-for-task basis, said method comprising the steps of:

attempting to access data contained in memory, said data being contained in a storage aggregate within said memory, said storage aggregate being marked to indicate a particular endian format type, said attempting step being performed by a task of a particular endian type;

determining whether said data's particular endian type is the same as that of said task;

double word reflecting said data when said data's particular endian type is found not to be the same as that of said task; and accessing said data.

\* \* \* \* \*

UNITED STATES PATENT AND TRADEMARK OFFICE
CERTIFICATE OF CORRECTION

PATENT NO. : 6,341,345 B1
DATED : January 22, 2002
INVENTOR(S) : Marc Alan Auslander and Larry Wayne Loen It is certified that error appears in the above-identified patent and that said Letters Patent is hereby corrected as shown below:

Column 22,
Line 23, "2" should be -- 1 --.

Signed and Sealed this

Twenty-seventh Day of August, 2002

Attest:

Attesting Officer

JAMES E. ROGAN
Director of the United States Patent and Trademark Office